(12) United States Patent
Kitahara et al.

(10) Patent No.: US 11,130,052 B2
(45) Date of Patent: Sep. 28, 2021

(54) INFORMATION PROCESSING SYSTEM, NON-TRANSITORY STORAGE MEDIUM HAVING STORED THEREIN INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Shinji Kitahara, Kyoto (JP); Koichi Kawamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 21 days.

(21) Appl. No.: 16/750,324

(22) Filed: Jan. 23, 2020

(65) Prior Publication Data
US 2021/0060423 A1 Mar. 4, 2021

(30) Foreign Application Priority Data

Aug. 28, 2019 (JP) .............................. JP2019-155906

(51) Int. Cl.
A63F 13/212 (2014.01)
A63F 13/428 (2014.01)
A63F 13/30 (2014.01)
A63F 13/42 (2014.01)
A63F 13/95 (2014.01)
A63F 13/92 (2014.01)

(52) U.S. Cl.
CPC ............ A63F 13/30 (2014.09); A63F 13/212 (2014.09); A63F 13/42 (2014.09); A63F 13/428 (2014.09); A63F 13/92 (2014.09); A63F 13/95 (2014.09); A63F 2300/204 (2013.01); A63F 2300/6045 (2013.01)

(58) Field of Classification Search
None
See application file for complete search history.

(56) References Cited

U.S. PATENT DOCUMENTS

2015/0157938 A1* 6/2015 Domansky .............. A63F 13/25
463/7

FOREIGN PATENT DOCUMENTS

JP 2019-33869 3/2019

OTHER PUBLICATIONS

Game Dave, "Wii Fit U First Look and Review | Game Dave", Nov. 5, 2013, YouTube, https://www.youtube.com/watch?v=SnJFs_6wFQE (Year: 2013).*

* cited by examiner

Primary Examiner — Damon J Pierce
(74) Attorney, Agent, or Firm — Nixon & Vanderhye PC

(57) ABSTRACT

An example of an information processing system sequentially executes a plurality of exercise events, and a user executes exercises corresponding to the exercise events, thereby causing a game to progress. The user sets in advance an exercise that the user wishes to avoid. When an exercise corresponding to an exercise event is the exercise set in advance by the user, a button operation is performed instead of the exercise, thereby causing the game to progress.

20 Claims, 20 Drawing Sheets

F I G. 1
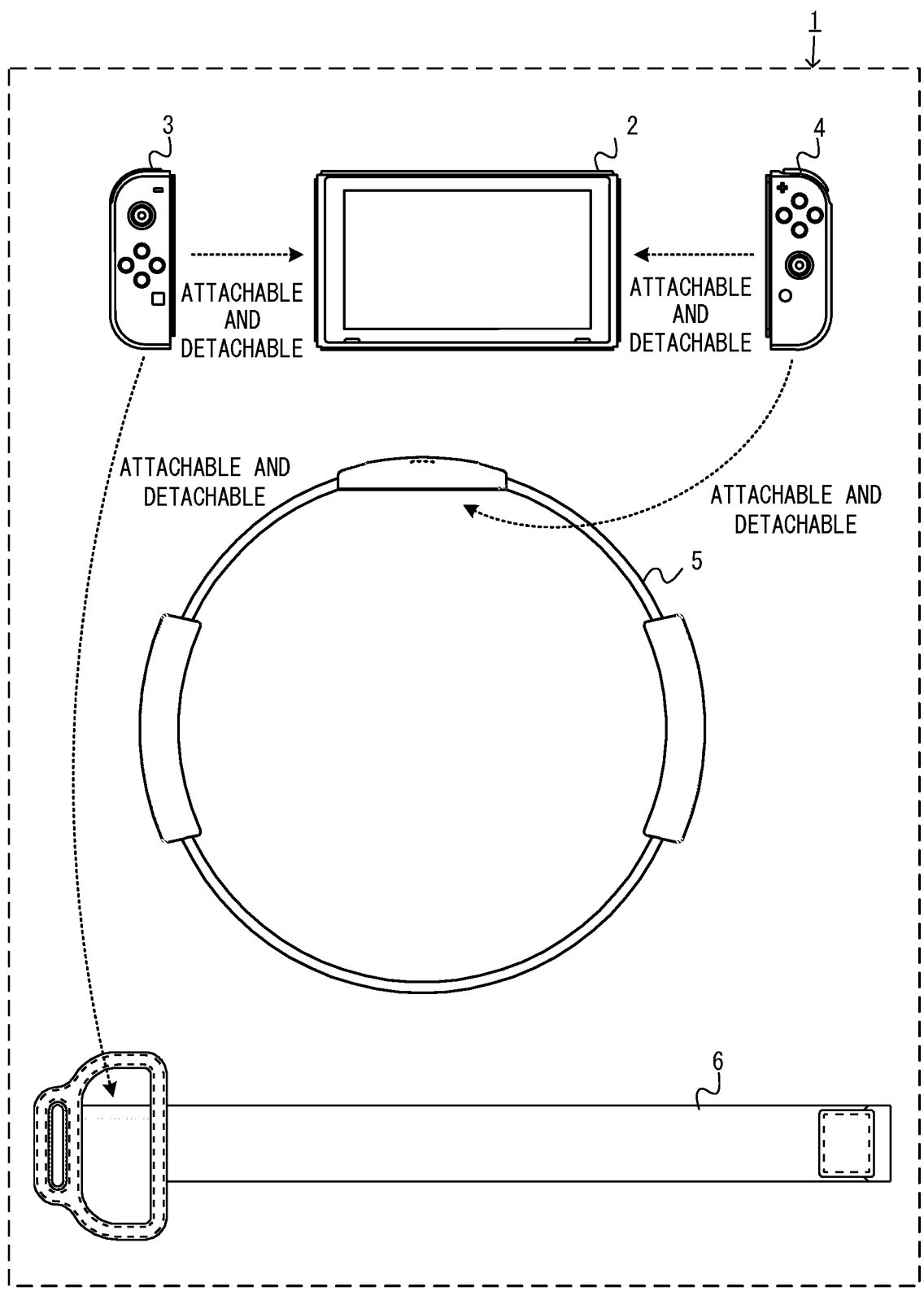

F I G. 9
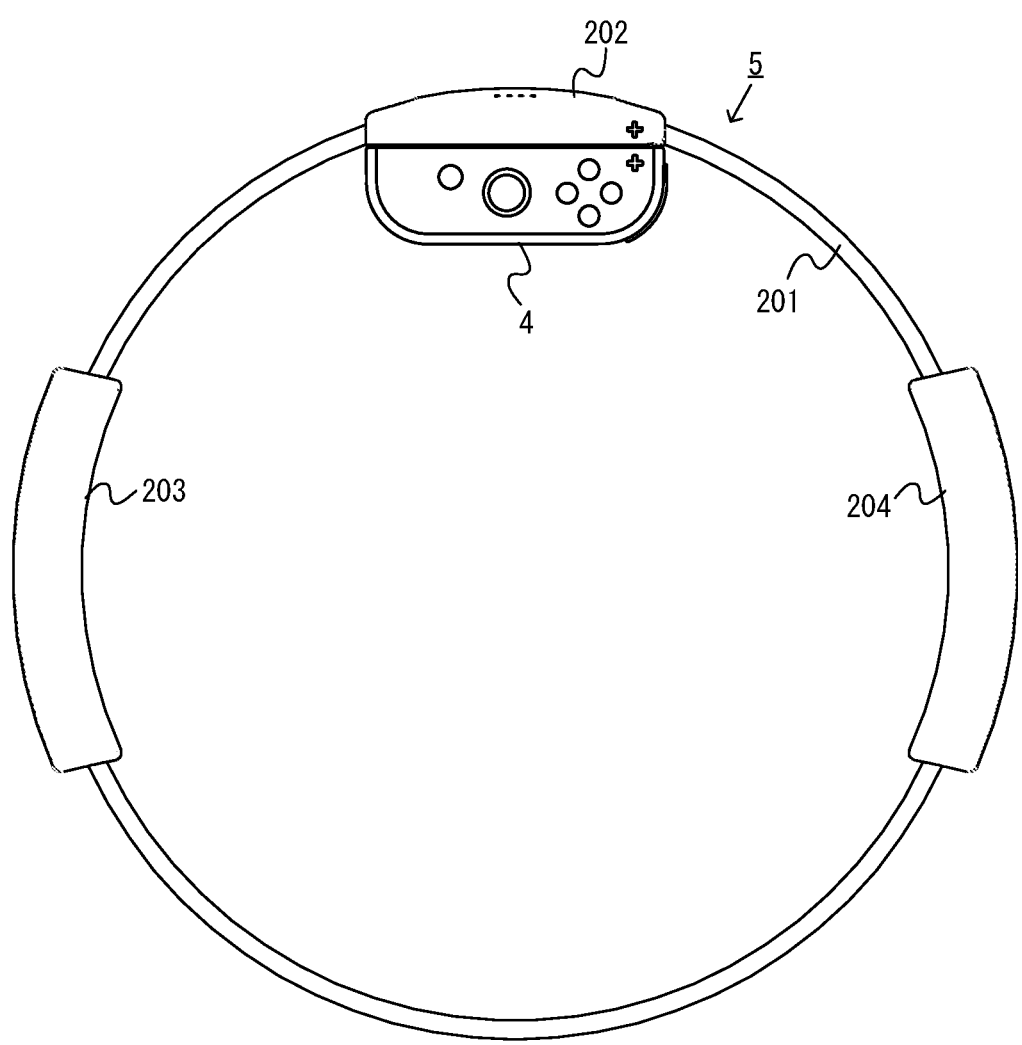

F I G. 20
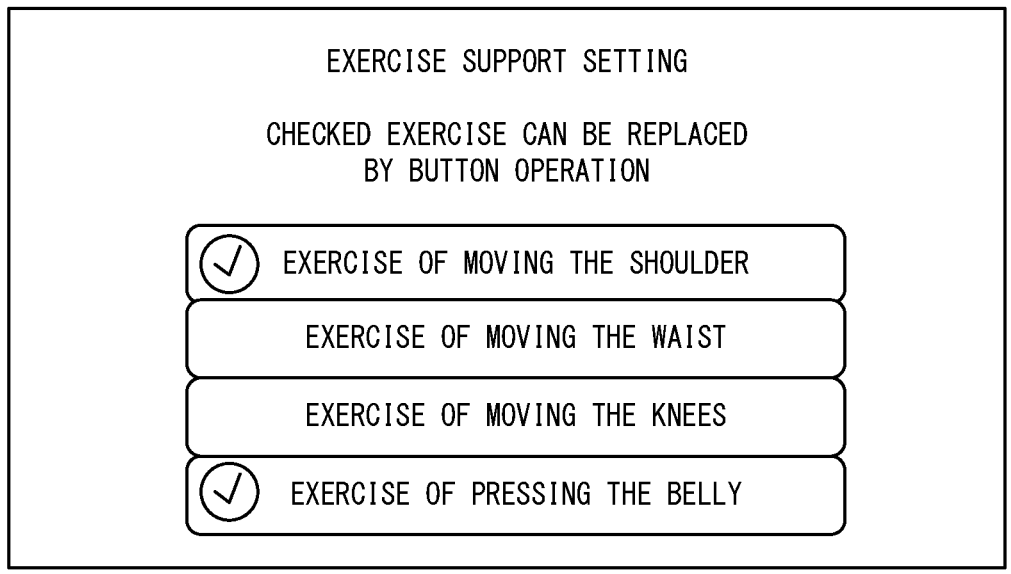

FIG. 23

| SCENE OF GAME | | EXERCISE EVENT |
|---|---|---|
| ADVANCE ALONG ROAD | A | JOGGING |
| ATTACK OF USER CHARACTER | B | SELECTABLE |
| DEFENSE OF USER CHARACTER | C | LIFT AND PUSH |
| ADVANCE ALONG RAIL | D | BELLY PUSH-IN |
| ⋮ | | |

FIG. 24

EXERCISE INFORMATION TABLE

| EXERCISE NAME | CONTENT OF EXERCISE | PART INFORMATION | | | |
|---|---|---|---|---|---|
| | | SHOULDERS | WAIST | KNEES | BELLY |
| SQUAT | EXERCISE OF BENDING THE KNEES | 0 | 1 | 1 | 0 |
| LIFT AND PUSH | EXERCISE OF LIFTING BOTH ARMS AND PUSHING IN RING | 1 | 0 | 0 | 0 |
| BELLY PUSH-IN | EXERCISE OF PRESSING RING AGAINST ABDOMINAL AREA | 0 | 0 | 0 | 1 |
| ⋮ | | | | | |

USER INFORMATION

| USER NAME | USER PART INFORMATION | | | | AGE | WEIGHT | PROGRESS INFORMATION |
|---|---|---|---|---|---|---|---|
| | SHOULDERS | WAIST | KNEES | BELLY | | | |
| USER A | 0 | 0 | 1 | 0 | xx | xx | xx |
| USER B | 1 | 0 | 0 | 0 | xx | xx | xx |
| USER C | 0 | 0 | 0 | 1 | xx | xx | xx |
| ⋮ | | | | | | | |

INFORMATION PROCESSING SYSTEM, NON-TRANSITORY STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

The application claims priority to Japanese Patent Application No. 2019-155906, filed on Aug. 28, 2019, the entire contents of which is incorporated herein by reference.

FIELD

The present disclosure relates to an information processing system, an information processing program, an information processing apparatus, and an information processing method that are capable of performing a process corresponding to the exercise of a user.

BACKGROUND AND SUMMARY

As related art, for example, there is a technique for inputting a command based on the motion of a player in a game.

However, in a game that progresses by a user moving their body, it may be difficult for some user to cause the game to progress, and there is room for improvement in this game.

Therefore, it is an object of an exemplary embodiment to provide an information processing system capable of, in a game that progresses by a user moving their body, supporting the progress of the game in accordance with the user.

To achieve the above object, the exemplary embodiment employs the following configurations.

An information processing system according to the exemplary embodiment includes at least one sensor that outputs sensor data corresponding to an exercise of a user, and at least one processor. The at least one processor is configured to: based on an input from the user, store user information in a storage medium in advance; and execute a game including an exercise event for causing the user to perform an exercise. The at least one processor is configured to: execute the exercise event during the execution of the game; acquire the sensor data from the at least one sensor; when the acquired sensor data satisfies a first condition associated with the exercise event to be executed, execute a process related to the exercise event, thereby causing the game to progress; and when the exercise event corresponds to the user information, and even when the sensor data is not acquired, perform the process related to the exercise event or skip at least a part of the process related to the exercise event, thereby causing the game to progress.

Based on the above, in a game that progresses by performing an exercise corresponding to an exercise event, it is possible to cause the game to progress even if a user does not perform the exercise.

In another configuration, the information processing system may further include an operation section that is operated by the user. Operation data corresponding to an operation on the operation section may be acquired. When the exercise event corresponds to the user information, the game may be caused to progress based on the operation data.

Based on the above, based on an operation on an operation section instead of the exercise corresponding to the exercise event, it is possible to cause the game to progress.

Further, in another configuration, in a case where the exercise event corresponds to the user information, and when the sensor data satisfying a second condition different from the first condition is acquired, the game may be caused to progress.

Based on the above, when sensor data satisfying a second condition different from a first condition is acquired, the game progresses. Thus, the user can cause the game to progress by performing another exercise instead of an exercise associated with user information.

Further, in another configuration, based on the input from the user, classification information regarding a classification of an exercise may be stored as the user information in the storage medium. When the exercise event is associated with a classification indicated by the classification information stored in the storage medium, and even when the sensor data is not acquired, the game may be caused to progress.

Based on the above, the user can specify the classification of an exercise and set the classification as user information. Thus, it is possible to cause the game to progress with a simple setting without setting the details of the exercise.

Further, in another configuration, the exercise event may be associated with part information regarding a body part. Based on the input from the user, user part information regarding a body part may be stored as the user information in the storage medium. When at least a part of the part information associated with the exercise event and at least a part of the user part information match each other, and even when the sensor data is not acquired, the game may be caused to progress.

Based on the above, the user sets user part information regarding a body part and thereby can cause the game to progress without performing an exercise based on the setting. Thus, it is possible to cause the game to progress with a simple setting without setting the details of the exercise.

Further, in another configuration, exercise information indicating a particular exercise may be stored as the user information in the storage medium. When the exercise event corresponds to the exercise information, and even when the sensor data is not acquired, the game may be caused to progress.

Based on the above, the user can cause the game to progress without performing a particular exercise specified in advance.

Further, in another configuration, at least one, other than an exercise event associated with the user information, of a plurality of exercise events may be selected and executed.

Based on the above, an exercise other an exercise based on user information set by the user is selected. Thus, it is possible to cause the game to progress by performing the selected exercise.

Further, in another configuration, there may be a case where a first exercise event for causing the user to perform an exercise selected by the user is executed, and a case where a second exercise event for causing the user to perform an exercise determined in advance is executed. In a case where the first exercise event is executed, and when the sensor data satisfying a condition corresponding to the exercise selected by the user is acquired, the game may be caused to progress. In a case where the second exercise event is executed, and when the second exercise event corresponds to the user information, and even when the sensor data satisfying the condition corresponding to the exercise determined in advance is not acquired, the game may be caused to progress.

Based on the above, it is possible to perform an exercise by reflecting the intention of the user, and when the user cannot select an exercise, it is possible to cause the game to progress even if the user does not perform an exercise.

Further, in another configuration, when the exercise event is executed at a first timing during the execution of the game, and the sensor data satisfying the first condition corresponding to the exercise event is acquired, the exercise event may be ended, thereby causing the game to progress, and the exercise event may be further executed next at a second timing after the first timing. When the exercise event corresponds to the user information, and even when the sensor data is not acquired, (A) the exercise event may be ended by performing the process related to the exercise event, or (B) the exercise event may be ended without performing the process related to the exercise event, thereby causing the game to progress.

Based on the above, in a game that progresses by sequentially performing exercises corresponding to exercise events, it is possible to cause the game to progress even if the user does not perform an exercise.

Further, in another configuration, when the exercise event does not correspond to the user information, a first instruction may be given to the user to perform an exercise corresponding to the exercise event. When the exercise event corresponds to the user information, a second instruction may be given to the user to perform an operation on the operation section.

Further, in another configuration, when the exercise event corresponds to the user information, the second instruction may be given instead of the first instruction.

Based on the above, when the exercise corresponding to the exercise event corresponds to user information, a different instruction is given. This is easily understandable to the user. For example, it is possible to prevent the user from erroneously performing an exercise.

Further, another exemplary embodiment may be an information processing apparatus included in an information processing system, or may be an information processing program. Alternatively, another exemplary embodiment may be an information processing method performed by the information processing system.

According to the exemplary embodiment, in a game that progresses by performing an exercise corresponding to an exercise event, it is possible to cause the game to progress even if the user does not perform the exercise.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a diagram showing non-limiting examples of apparatuses included in a game system;

FIG. 9 is a diagram showing a non-limiting example of a ring-shaped extension apparatus 5;

FIG. 20 is a diagram showing a non-limiting example of an exercise support setting screen;

FIG. 23 is a diagram showing non-limiting examples of a plurality of exercise events to be performed during the execution of the game according to the exemplary embodiment;

FIG. 24 is a diagram showing a non-limiting example of an exercise information table in which information regarding each exercise set in advance is stored;

DETAILED DESCRIPTION OF NON-LIMITING EXAMPLE EMBODIMENTS

Figure 2:
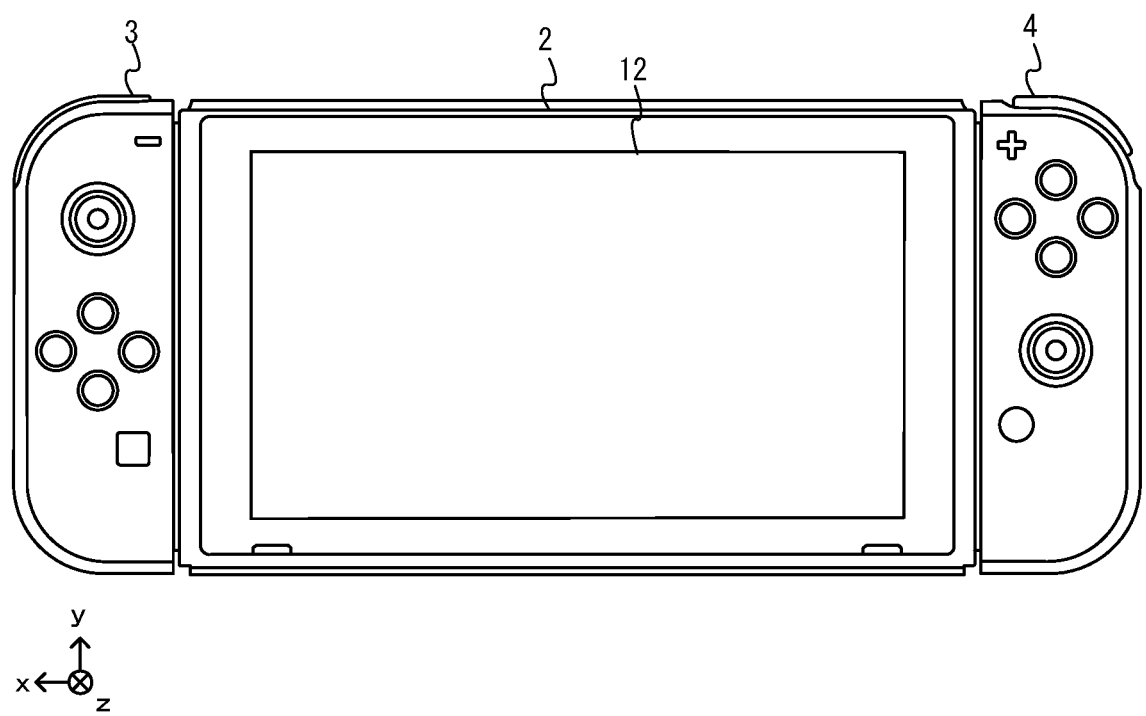
FIG. 2 is a diagram showing a non-limiting example of the state where a left controller 3 and a right controller 4 are attached to a main body apparatus 2.

A game system according to an example of an exemplary embodiment is described below. FIG. 1 is a diagram showing examples of apparatuses included in the game system. As shown in FIG. 1, a game system 1 includes a main body apparatus 2, a left controller 3, a right controller 4, a ring-shaped extension apparatus 5, and a belt-shaped extension apparatus 6.

The main body apparatus 2 is an example of an information processing apparatus and functions as a game apparatus main body in the exemplary embodiment. Each of the left controller 3 and the right controller 4 is attachable to and detachable from the main body apparatus 2 (see FIGS. 1 and 3). That is, a user can use a unified apparatus obtained by attaching each of the left controller 3 and the right controller 4 to the main body apparatus 2 (see FIG. 2). Further, the user can also use the main body apparatus 2, the left controller 3, and the right controller 4 as separate bodies (see FIG. 3). It should be noted that hereinafter, main body apparatus 2 and the controllers 3 and 4 will be occasionally collectively referred to as a "game apparatus".

The ring-shaped extension apparatus 5 is an example of an extension apparatus used in the right controller 4. The ring-shaped extension apparatus 5 is used in the state where the right controller 4 is attached to the ring-shaped extension apparatus 5. Further, the belt-shaped extension apparatus 6 is an example of an extension apparatus used in the left controller 3. The belt-shaped extension apparatus 6 is used in the state where the left controller 3 is attached to the belt-shaped extension apparatus 6. As described above, in the exemplary embodiment, the user can also use the controllers 3 and 4 in the state where the controllers 3 and 4 are attached to the respective extension apparatuses (see FIG. 12). It should be noted that not only the right controller 4 but also to the left controller 3 may be attachable to the ring-shaped extension apparatus 5. Not only the left controller 3 but also the right controller 4 may be attachable to the belt-shaped extension apparatus 6.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
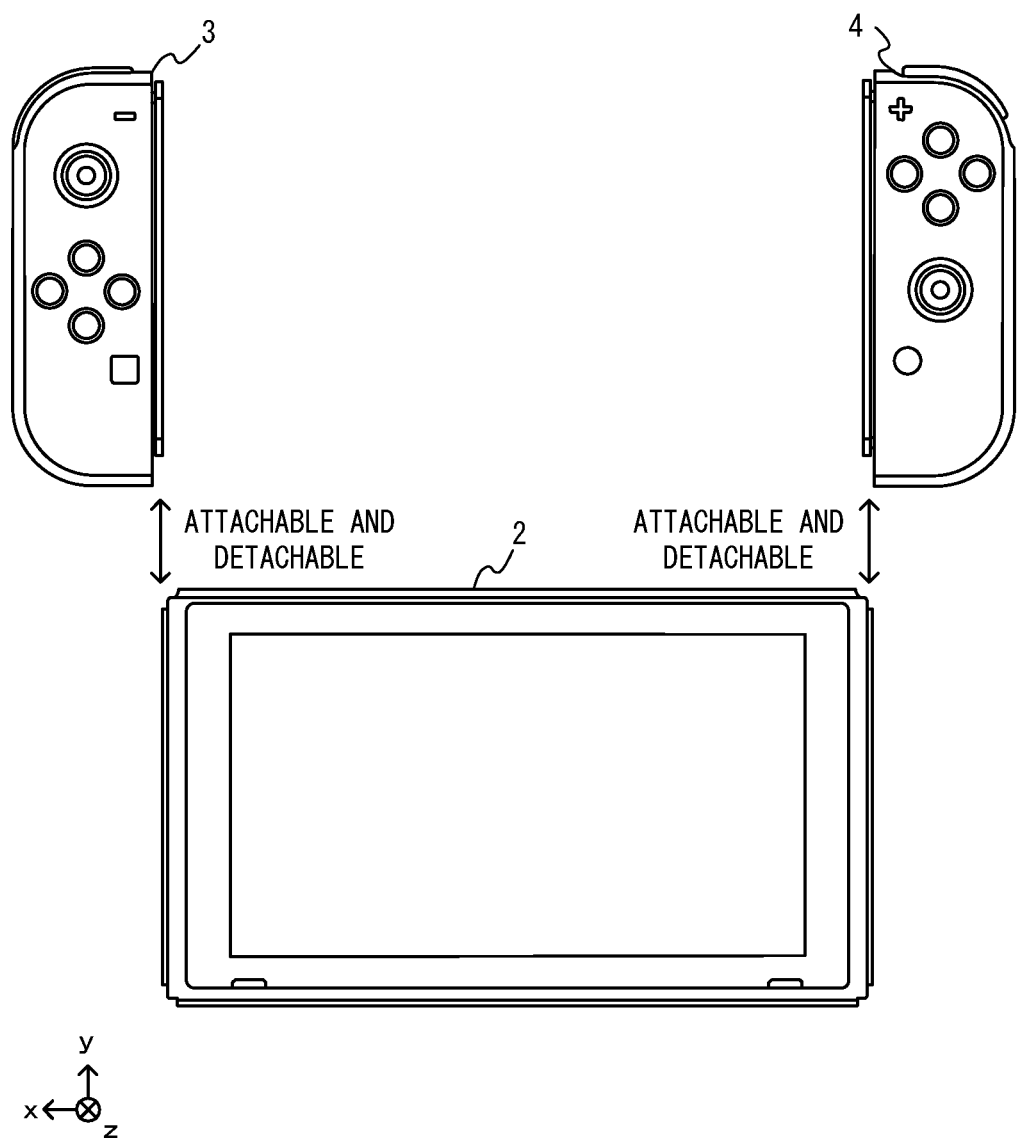
FIG. 3 is a diagram showing a non-limiting example of the state where each of the left controller 3 and the right controller 4 is detached from the main body apparatus 2.

FIG. 3 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 4:
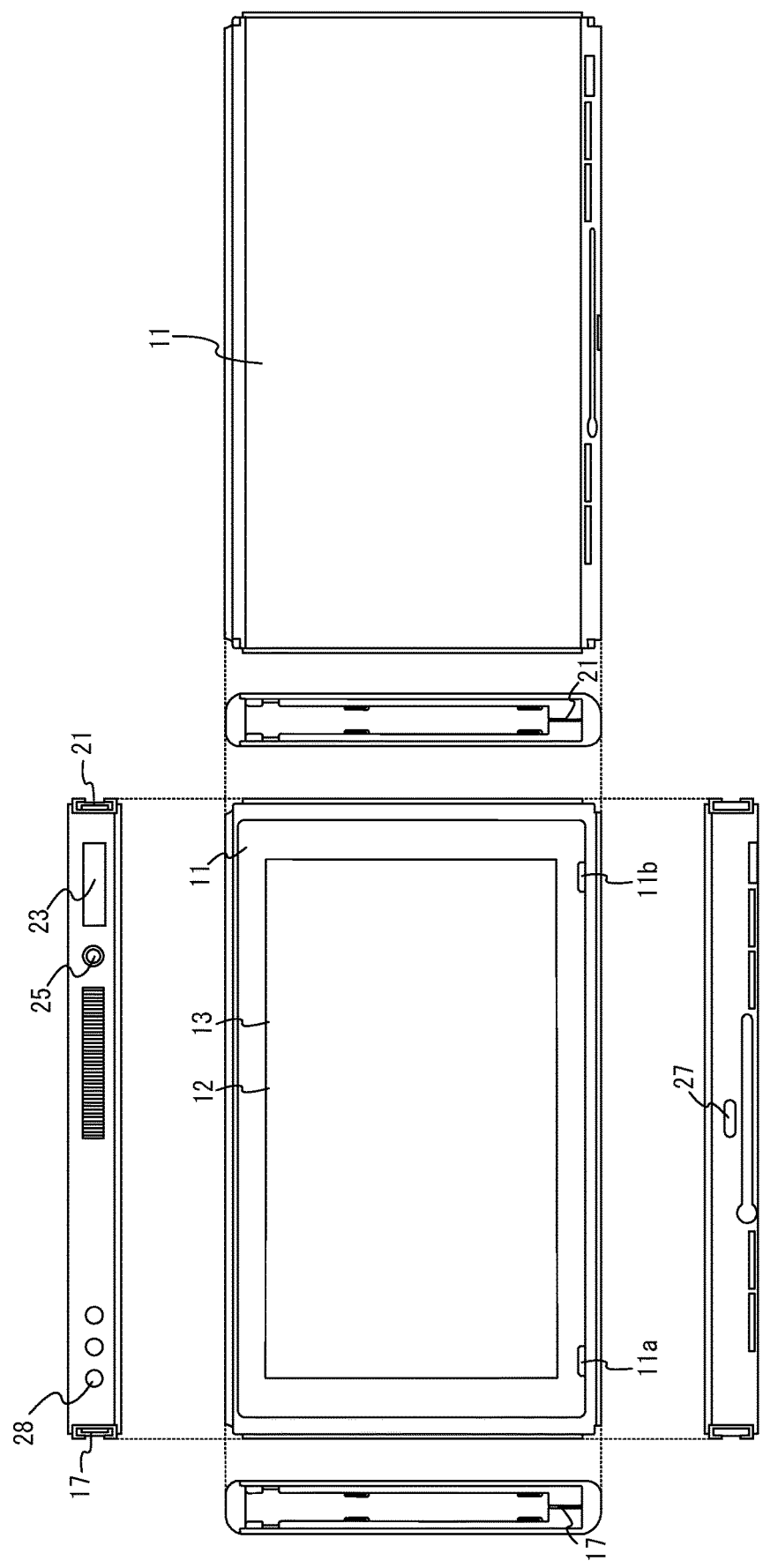
FIG. 4 is six orthogonal views showing a non-limiting example of the main body apparatus 2.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 7) within the housing 11. As shown in FIG. 4, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 5:
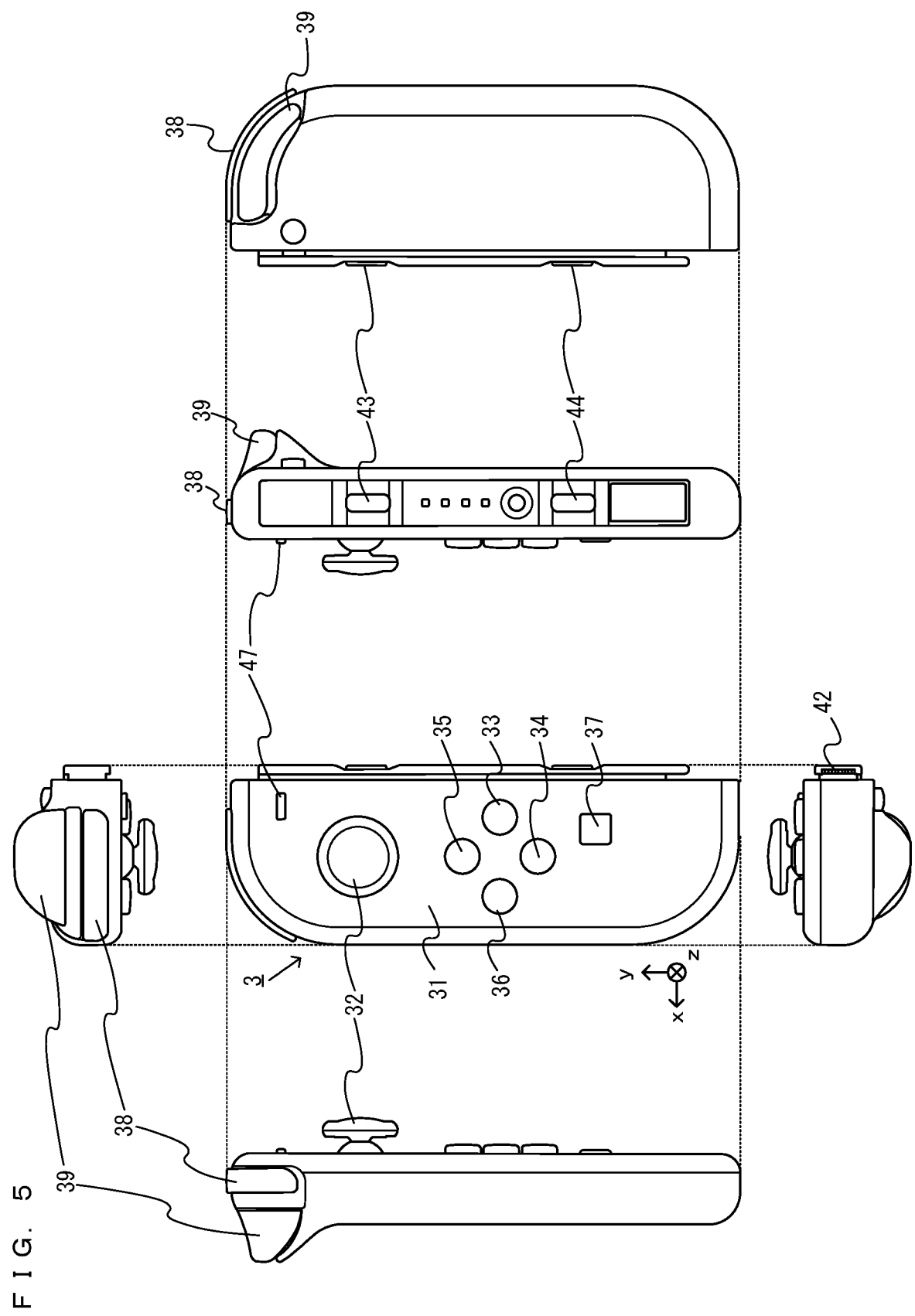
FIG. 5 is six orthogonal views showing a non-limiting example of the left controller 3.

FIG. 5 is six orthogonal views showing an example of the left controller 3. As shown in FIG. 5, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 5, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 6:
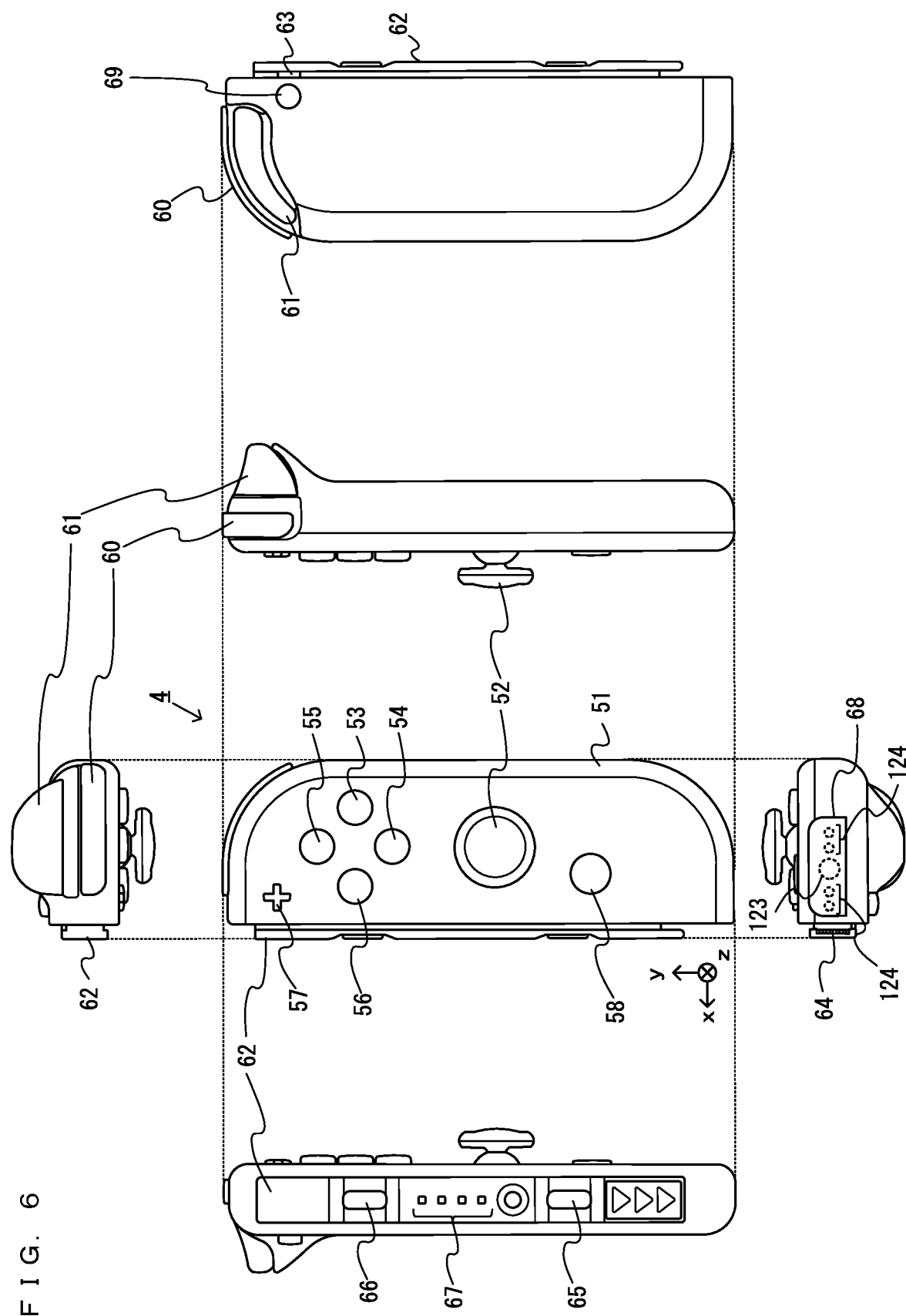
FIG. 6 is six orthogonal views showing a non-limiting example of the right controller 4.

FIG. 6 is six orthogonal views showing an example of the right controller 4. As shown in FIG. 6, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 6) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 6) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, the right controller 4 includes a terminal 64 for the right controller 4 to perform wired communication with the main body apparatus 2.

Figure 7:
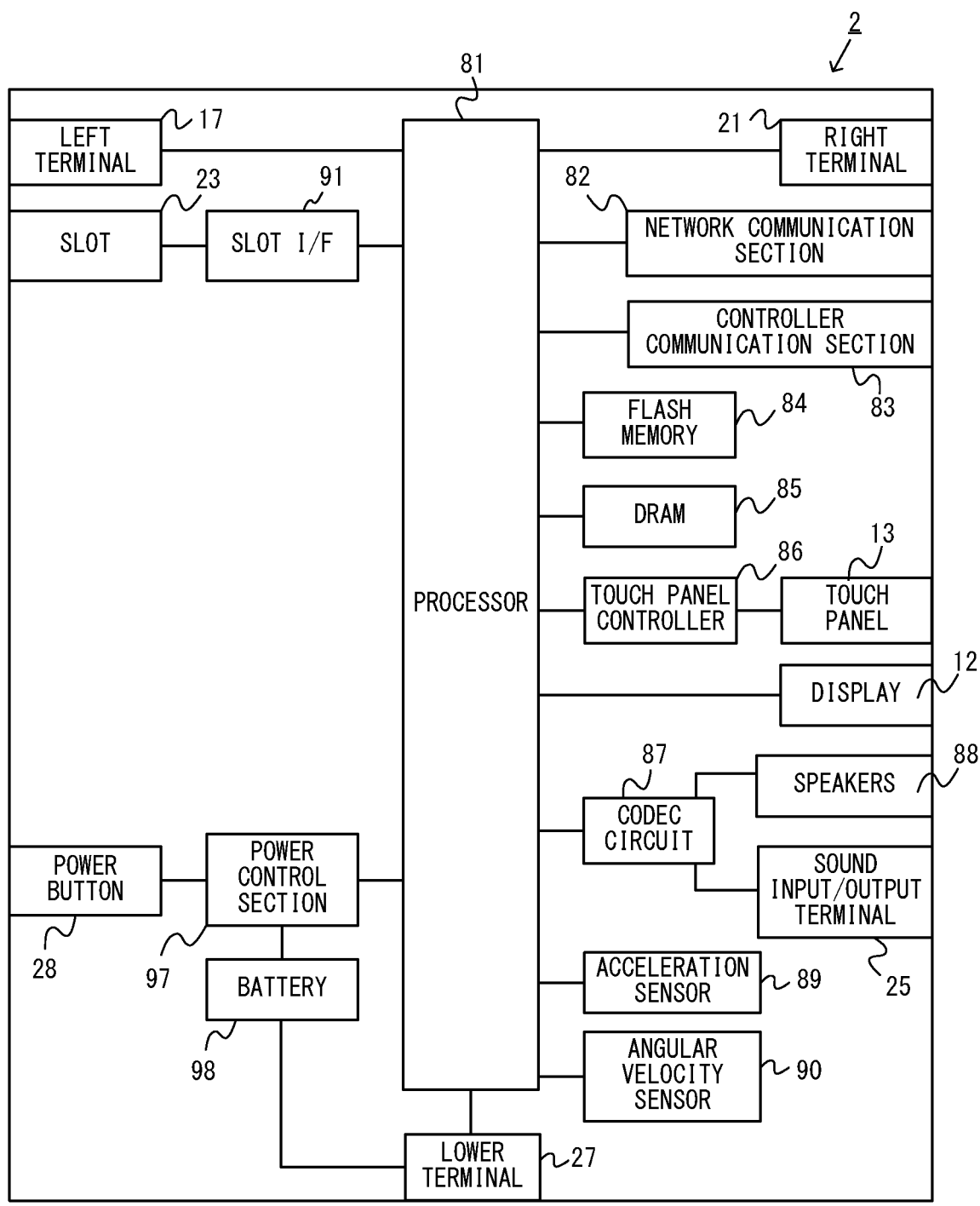
FIG. 7 is a block diagram showing a non-limiting example of the internal configuration of the main body apparatus 2.

FIG. 7 is a block diagram showing an example of the internal configuration of the main body apparatus 2. The main body apparatus 2 includes components 81 to 91, 97, and 98 shown in FIG. 7 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 2) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 2). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 7, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 8:
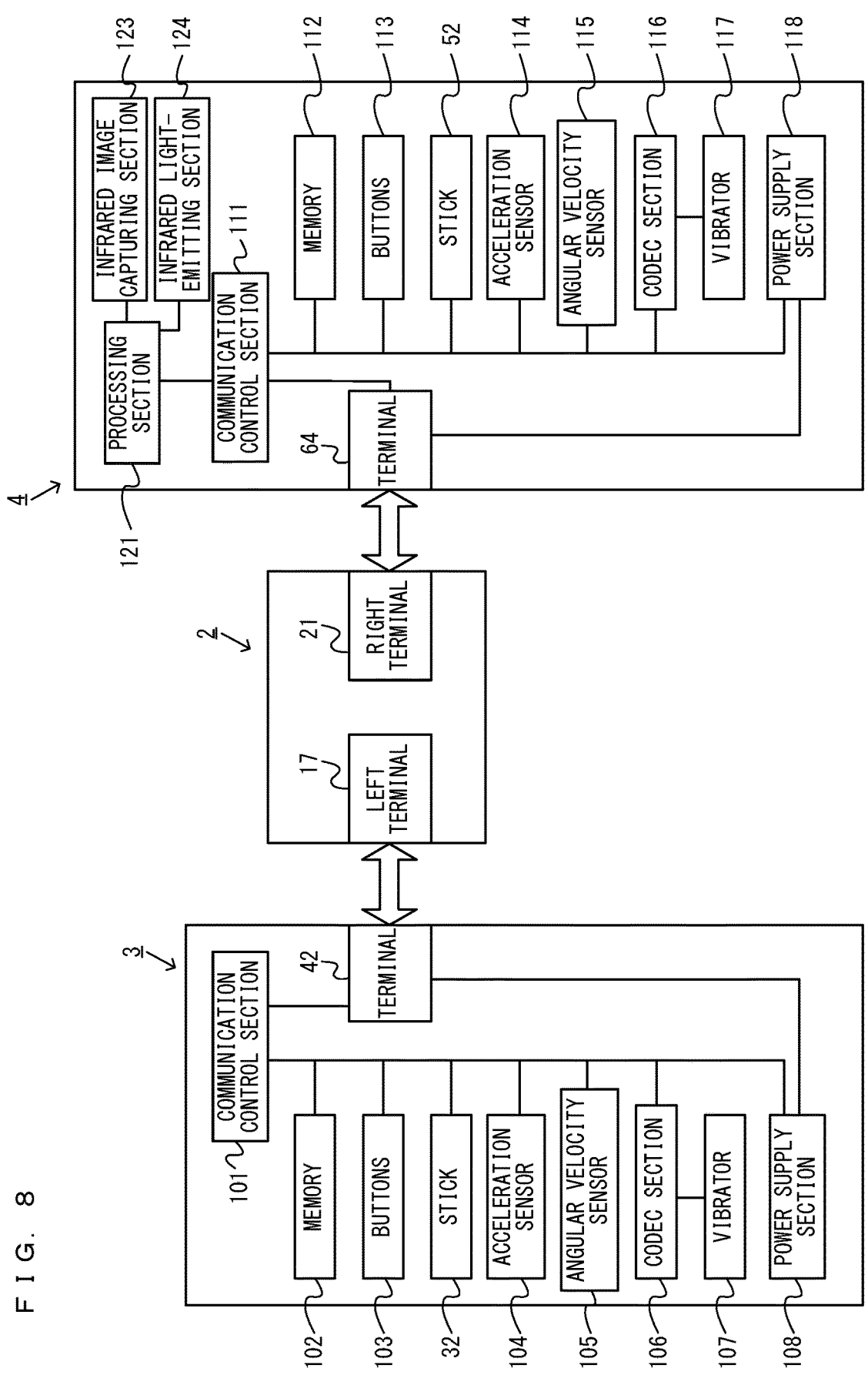
FIG. 8 is a block diagram showing non-limiting examples of the internal configurations of the main body apparatus 2 and the left controller 3 and the right controller 4.

FIG. 8 is a block diagram showing examples of the internal configurations of the main body apparatus 2, the left controller 3, and the right controller 4. It should be noted that the details of the internal configuration of the main body apparatus 2 are shown in FIG. 7 and therefore are omitted in FIG. 8.

The left controller 3 includes a communication control section 101, which communicates with the main body apparatus 2. As shown in FIG. 8, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 8) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 5) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 5). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 8, the power control circuit is connected to the battery and also connected to components of the left controller 3 (specifically, components that receive power supplied from the battery).

As shown in FIG. 8, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the infrared image capturing section 123 and the infrared light-emitting section 124.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

FIG. 9 is a diagram showing an example of a ring-shaped extension apparatus. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 9, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 (see FIG. 6) of the right controller 4. The slider 62 is inserted into a rail member in a predetermined linear direction (i.e., a slide direction), whereby the rail member engages with the slider 62 in the state where the slider 62 can move sliding in the linear direction relative to the rail member. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the right controller 4 includes a latch portion 63 (see FIG. 6). The latch portion 63 is provided so as to protrude sideways (i.e., the z-axis positive direction shown in FIG. 6) from the slider 62. While the latch portion 63 is allowed to move into the slider 62, the latch portion 63 is urged (e.g., by means of a spring) into the position described above in which the latch portion 63 is protruding sideways. The rail portion is provided with a notch. The latch portion 63 latches the notch in the state where the slider 62 is inserted into the back of the rail portion. As the latch portion 63 engages with the notch while the rail portion is in engagement with the slider 62, the right controller 4 is attached to the main portion 202.

Note that the right controller 4 includes the release button 69 that can be pressed (see FIG. 6). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 9, the ring-shaped extension apparatus 5 includes grip covers 203 and 204. The grip covers 203 and 204 are components to be held by the user. In the present embodiment, the grip covers 203 and 204 can be removed from the ring-shaped portion 201. In the exemplary embodiment, the left grip cover 203 is provided in a left holding portion near the left end of the ring-shaped portion 201, and the right grip cover 204 is provided in a right holding portion near the right end of the ring-shaped portion 201. It should be noted that the number of holding portions is optional, and in accordance with an operation method to be assumed, holding portions may be provided in three or more places, or a holding portion may be provided in only a single place. Further, depending on the content of the game (or the content of a fitness operation to be performed by the user in the game), only a particular holding portion among a plurality of holding portions may be held by one hand or both hands.

Figure 10:
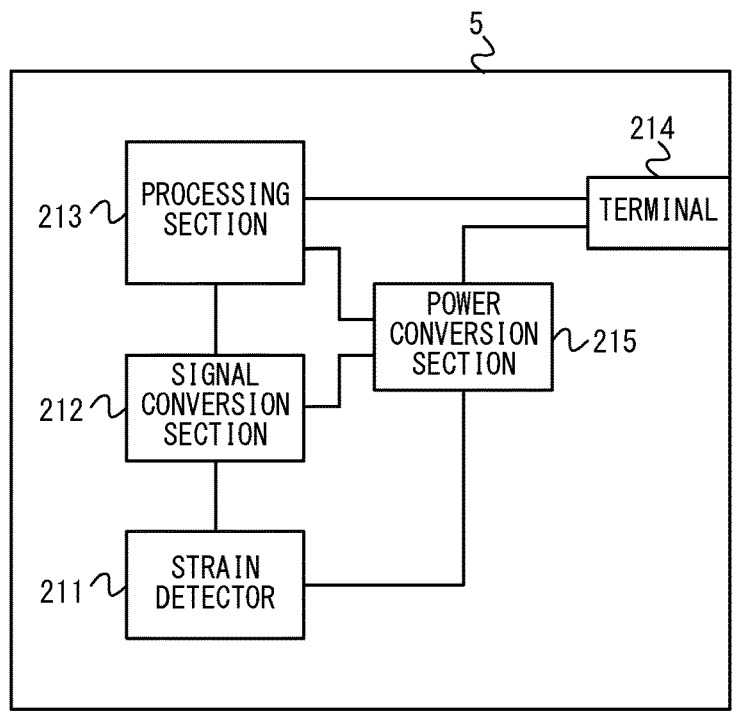
FIG. 10 is a block diagram showing a non-limiting example of the internal configuration of the ring-shaped extension apparatus 5.

FIG. 10 is a block diagram showing an electrical connection relationship between components of the ring-shaped extension apparatus 5. As shown in FIG. 10, the ring-shaped extension apparatus 5 includes a strain detector 211. The strain detector 211 is an example of a detector that detects deformation of the ring-shaped portion 201. In the present embodiment, the strain detector 211 includes a strain gauge. The strain detector 211 outputs a signal representing the strain of the base portion in accordance with the deformation of the elastic member (in other words, a signal representing the magnitude of deformation and the direction of deformation of the elastic member).

Here, in the exemplary embodiment, the ring-shaped portion 201 includes the elastic member that can elastically deform and the base portion. The base portion holds end portions of the elastic member so that a ring is formed by the base portion and the elastic member. It should be noted that the base portion is provided within the main portion 202, and therefore is not shown in FIG. 9. The base portion is composed of a material having higher stiffness than that of the elastic member. For example, the elastic member is composed of a resin (specifically, FRP (Fiber Reinforced Plastics)), and the base portion is composed of a metal. The strain gauge is provided in the base portion and detects the strain of the base portion. When the ring-shaped portion 201 deforms from a steady state, the base portion strains due to the deformation. Thus, the strain gauge detects the strain of the base portion. Based on the detected strain, it is possible to calculate the direction in the ring-shaped portion 201 deforms (i.e., the direction in which the two grip covers 203 and 204 come close to or go away from each other) and the deformation amount.

It should be noted that in another exemplary embodiment, the strain detector 211 may include any sensor capable of detecting that the ring-shaped portion 201 deforms from the steady state, instead of the strain gauge. For example, the detector 211 may include a pressure-sensitive sensor that detects pressure applied when the ring-shaped portion 201 deforms, or may include a bending sensor that detects the amount of bending the ring-shaped portion 201.

The ring-shaped extension apparatus 5 includes a signal conversion section 212. In the present embodiment, the signal conversion section 212 includes an amplifier and an AD converter. The signal conversion section 212 is electrically connected to the strain detector 211 so as to amplify the output signal from the strain detector 211 through the amplifier and performs an AD conversion through the AD converter. The signal conversion section 212 outputs a digital signal representing the strain value. Note that in other embodiments, the signal conversion section 212 may not include an AD converter, and a processing section 213 to be described below may include an AD converter.

The ring-shaped extension apparatus 5 includes the processing section 213. The processing section 213 is a processing circuit including a processor and a memory, and is an MCU (Micro Controller Unit), for example. The processing section 213 is electrically connected to the signal conversion section 212, and the output signal from the signal conversion section 212 is input to the processing section 213. The ring-shaped extension apparatus 5 includes the terminal 214. The terminal 214 is electrically connected to the processing section 213. When the right controller 4 is attached to the ring-shaped extension apparatus 5, the processing section 213 sends information representing the strain value that is represented by the output signal from the signal conversion section 212 (in other words, the ring operation data described below) to the right controller 4 through the terminal 214.

The ring-shaped extension apparatus 5 includes a power conversion section 215. The power conversion section 215 is electrically connected to the sections 211 to 214. The power conversion section 215 supplies power, which is supplied from the outside (i.e., the right controller 4) through the terminal 214, to the sections 211 to 214. The power conversion section 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the amount of deformation of the elastic member 241 based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 11:
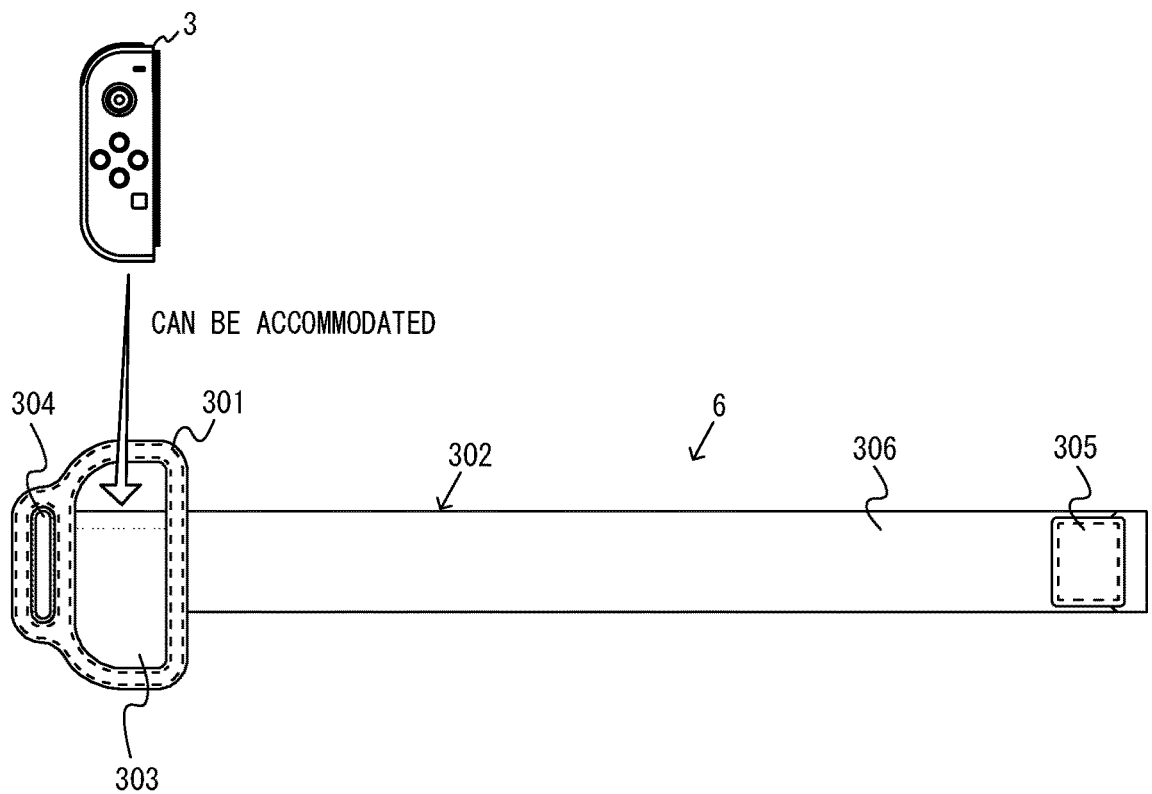
FIG. 11 is a diagram showing a non-limiting example of a belt-shaped extension apparatus 6.

FIG. 11 is a diagram showing an example of a belt-shaped extension apparatus. The belt-shaped extension apparatus 6 is fastened to a leg of the user with the left controller 3 accommodated therein (see FIG. 12). As shown in FIG. 11, the belt-shaped extension apparatus 6 includes an accommodating portion 301 and a belt portion 302. The accommodating portion 301 has a flat shape and is capable of accommodating the left controller 3 therein. Specifically, the accommodating portion 301 includes a pocket portion 303. The pocket portion 303 is formed in a bag shape that is sized so that the left controller 3 can be accommodated therein. In the present embodiment, as the left controller 3 is accommodated in the accommodating portion 301, the left controller 3 is attached to the belt-shaped extension apparatus 6. Note that in other embodiments, there is no limitation on the configuration for attaching the left controller 3 to the belt-shaped extension apparatus 6.

The accommodating portion 301 includes a through hole 304 on one side of the pocket portion 303. The belt portion 302 has a strip shape, and one end of the belt portion 302 is fixed to the accommodating portion 301. In the exemplary embodiment, the belt portion 302 is composed of a material having stretch properties (e.g., woven rubber).

A first touch fastener 305 and a second touch fastener 306 are provided on the surface of the belt portion 302 on the same side as the pocket portion 303 is provided on the accommodating portion 301. The first touch fastener 305 is provided near the end portion of the belt portion 302 that is on the opposite side from the other end portion that is secured to the accommodating portion 301. The second touch fastener 306 is provided on the same surface as the first touch fastener 305 and on the side that is closer to the accommodating portion 301 than the first touch fastener 305. The first touch fastener 305 and the second touch fastener 306 are attachable to and detachable from each other. For example, the first touch fastener 305 is a hook-side touch fastener, and the second touch fastener 306 is a loop-side touch fastener.

When fastening the belt-shaped extension apparatus 6, the user passes the belt portion 302 through the through hole 304 with the belt portion 302 wound around a leg, and the user fastens together the first touch fastener 305 and the second touch fastener 306. Thus, the user can fasten the belt-shaped extension apparatus 6, with the left controller 3 accommodated therein, to a leg, as shown in FIG. 12.

Figure 12:
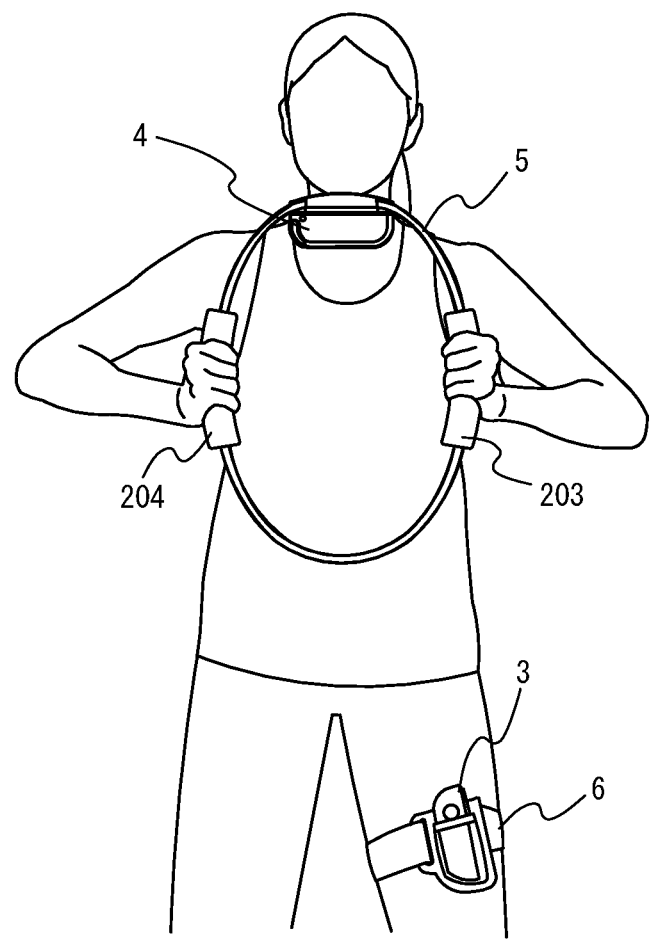
FIG. 12 is a diagram showing a non-limiting example of the state where a user uses the ring-shaped extension apparatus 5 and the belt-shaped extension apparatus 6.

FIG. 12 is a diagram showing an example of the state where the user uses the ring-shaped extension apparatus 5 and the belt-shaped extension apparatus 6. As shown in FIG. 12, the user can play a game using two extension apparatuses 5 and 6 in addition to a game apparatus (e.g., the main body apparatus 2 and the controllers 3 and 4). For example, the user can use the ring-shaped extension apparatus 5 and the belt-shaped extension apparatus 6 as a set.

For example, as shown in FIG. 12, the user holds the ring-shaped extension apparatus 5 with the right controller 4 attached thereto with both hands, and fastens the belt-shaped extension apparatus 6 with the left controller 3 accommodated therein to a leg. The user can play a game by performing an operation using the ring-shaped extension apparatus 5 (e.g., an operation of bending the ring-shaped extension apparatus 5 and an operation of moving the ring-shaped extension apparatus 5), and performing an operation of moving the leg to which the belt-shaped extension apparatus 6 is fastened.

It should be noted that FIG. 12 shows the state where the user performs the operation of bending the ring-shaped extension apparatus 5 while holding the grip covers 203 and 204. By this operation, the user can perform a fitness operation for strengthening both arms as a game operation. It should be noted that the user can perform a game operation by various operations on the ring-shaped extension apparatus 5. For example, the user can also perform the operation of bending the ring-shaped extension apparatus 5 in the state where the user holds one of the grip covers with both hands and holds the other grip cover against their abdominal area. By this operation, the user can perform a fitness operation for strengthening their arms and abdominal muscles as a game operation. Further, the user can also perform the operation of bending the ring-shaped extension apparatus 5 in the state where the user sandwiches the ring-shaped extension apparatus 5 with their legs while holding the grip covers 203 and 204 against the inner thighs of both legs. By this operation, the user can perform a fitness operation for strengthening leg muscles as a game operation.

When the game process is executed on the main body apparatus 2, the right controller 4 receives the ring operation data from the ring-shaped extension apparatus 5. The ring operation data includes information that represents the strain value. Specifically, the processing section 213 of the ring-shaped extension apparatus 5 transmits the ring operation data to the right controller 4 through the terminal 214. For example, the processing section 213 repeatedly transmits the ring operation data at the rate of once per a predetermined amount of time.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that in the state where the right controller 4 is attached to the ring-shaped extension apparatus 5, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

On the other hand, where the game process is executed on the main body apparatus 2, the communication control section 101 of the left controller 3 transmits the left controller operation data including information obtained from the input sections included in the left controller 3 (specifically, the buttons 103, the analog stick 32 and the sensors 104 and 105) to the main body apparatus 2. In the state where the left controller 3 is attached to the belt-shaped extension apparatus 6, the communication from the left controller 3 to the main body apparatus 2 is done by wireless communication.

(Overview of Game According to Exemplary Embodiment)

Next, an overview of a game according to the exemplary embodiment is described. In the exemplary embodiment, the game is performed using the ring-shaped extension apparatus 5 to which the right controller 4 is attached, and the belt-shaped extension apparatus 6 to which the left controller 3 is attached. As shown in FIG. 12, in the state where the user holds the ring-shaped extension apparatus 5 with both hands, and the belt-shaped extension apparatus 6 is attached to their leg (e.g., thigh), the user performs the game. Hereinafter, the ring-shaped extension apparatus 5 to which the right controller 4 is attached will be occasionally referred to as a "ring controller", and the belt-shaped extension apparatus 6 to which the left controller 3 is attached will be occasionally referred to as a "leg controller".

Figure 13:
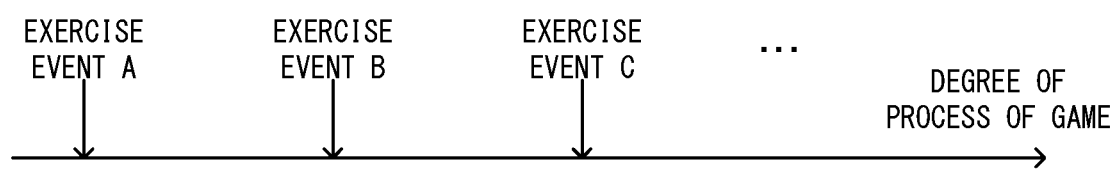
FIG. 13 is a diagram illustrating the progress of a non-limiting game according to the exemplary embodiment.

FIG. 13 is a diagram illustrating the progress of the game according to the exemplary embodiment. The game according to the exemplary embodiment is a fitness game for causing the user to perform exercises. The game according to the exemplary embodiment includes a plurality of exercise events (A to C and the like) for causing the user to perform exercises. During the execution of the game, an exercise event is performed in accordance with the progress of the game. The exercise event is an event that occurs during the execution of the game to cause the user to perform an exercise. In the exercise event, an instruction is given to the user to perform any of a plurality of exercises. The user performs the exercise in accordance with the instruction, whereby the game progresses. For example, an exercise event A occurs, and the user performs an exercise corresponding to the exercise event A, whereby the exercise event A ends. If the exercise event A ends, the game progresses. Next, an exercise event B occurs, and the user performs an exercise corresponding to the exercise event B. In this manner, a plurality of exercise events are sequentially executed, and the user performs an exercise corresponding to each exercise event, whereby the game progresses.

The degree of progress of the game is determined based on the content or the type of the game. For example, in a game where a user character corresponding to the user moves in a virtual space, the degree of progress of the game may be determined based on the position of the user character in the virtual space. Further, in a game having a plurality of stages, the degree of progress of the game may be determined based on the progress state of each stage, the number of times the transition from a certain stage to the next stage is repeated, or the like. Further, in a game for the purpose of defeating an enemy, the degree of progress of the game may be determined based on the number of defeated enemies or the type (level) of a defeated enemy. Further, in a turn-based battle game where the action of the ally (player) side and the action of the enemy side are alternately performed, the degree of progress of the game may be determined based on how many turns elapse since the execution of the battle game starts. Then, causing the game to progress means advancing and returning the various degrees of progress as described above.

The game according to the exemplary embodiment is an adventure game where a user character adventures in a virtual space. In the process in which the user character adventures in the virtual space, an exercise event occurs based on the position of the user character or an action (e.g., an attack action) performed by the user character, and the user performs an exercise corresponding to the exercise event. To cause the adventure game to progress, the user needs to perform an exercise. Thus, it is possible to cause the user to perform a continuous exercise over a long period.

Figure 14:
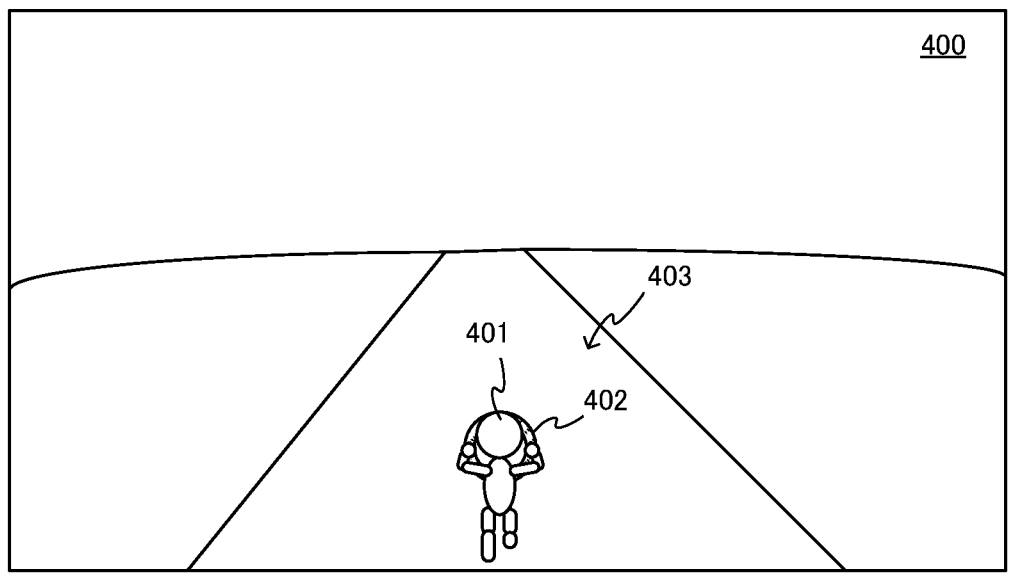
FIG. 14 is a diagram showing a non-limiting example of a game image when the game according to the exemplary embodiment is performed.

FIG. 14 is a diagram showing an example of a game image when the game according to the exemplary embodiment is performed. A game image 400 is displayed on the display 12 or an external stationary monitor (e.g., a television).

As shown in FIG. 14, the game image 400 includes a user character 401. The user character 401 holds a virtual ring controller 402. The orientation of the ring controller 402 in the virtual space is set to match the orientation of the ring controller in real space. Based on the action of the user, the user character 401 moves along a predetermined path in the virtual space or performs a predetermined action in the virtual space.

The user performs an exercise to cause the user character 401 to jog along a road 403. For example, if the user stamps their feet as if jogging in real space, the state where the user character 401 jogs along the road 403 is displayed.

Specifically, based on sensor data from the leg controller (data from the acceleration sensor 104 and the angular velocity sensor 105), the main body apparatus 2 determines whether or not the user performs a jogging action (stamps their feet). It should be noted that based also on sensor data from the ring controller (data from the acceleration sensor 114, the angular velocity sensor 115, and the strain gauge) in addition to the sensor data from the leg controller, the main body apparatus 2 may make the determination. As a result of the determination, when it is determined that the user performs the jogging action, the main body apparatus 2 causes the user character 401 to move forward along the road 403 in the virtual space.

Figure 15:
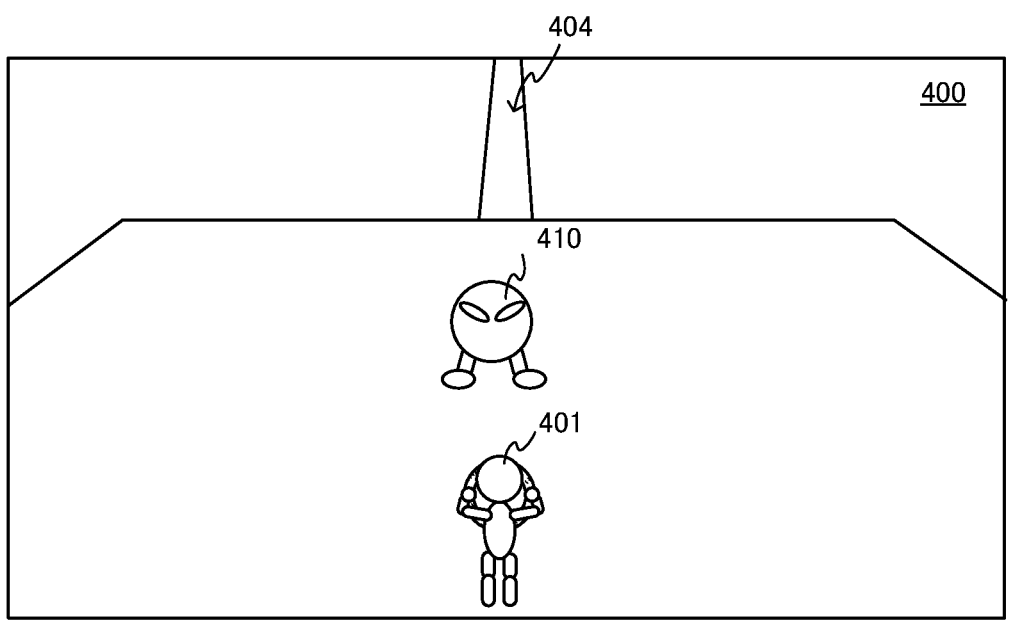
FIG. 15 is a diagram showing a non-limiting example of a game image after a user character 401 advances by a predetermined distance along a road 403 in FIG. 14.

FIG. 15 is a diagram showing an example of a game image after the user character 401 advances by a predetermined distance along the road 403 in FIG. 14. As shown in FIG. 15, if the user character 401 advances along the road 403, the user character 401 reaches a predetermined position in the virtual space and encounters an enemy character 410. When the user character 401 encounters the enemy character 410, the user character 401 and the enemy character 410 fight against each other. When the user character 401 defeats the enemy character 410, the user can advance the game. That is, in order for the user character 401 to advance to a virtual space beyond the enemy character 410, the user character 401 needs to defeat the enemy character 410. In the virtual space beyond the enemy character 410, for example, a rail 404 is provided. If the user character 401 defeats the enemy character 410 and further advances along the rail 404, another virtual space extends.

In the fight between the user character 401 and the enemy character 410, the attack of the user character 401 and the attack of the enemy character 410 (a defense for the user character 401) are alternately made.

When the user character 401 makes an attack, an exercise event is executed, and the user performs an exercise in the exercise event. Further, when the user character 401 makes a defense, another exercise event is executed, and the user performs an exercise in the exercise event. When the user character 401 further makes an attack, yet another exercise event is further executed, and the user performs an exercise in the exercise event.

Figure 16:
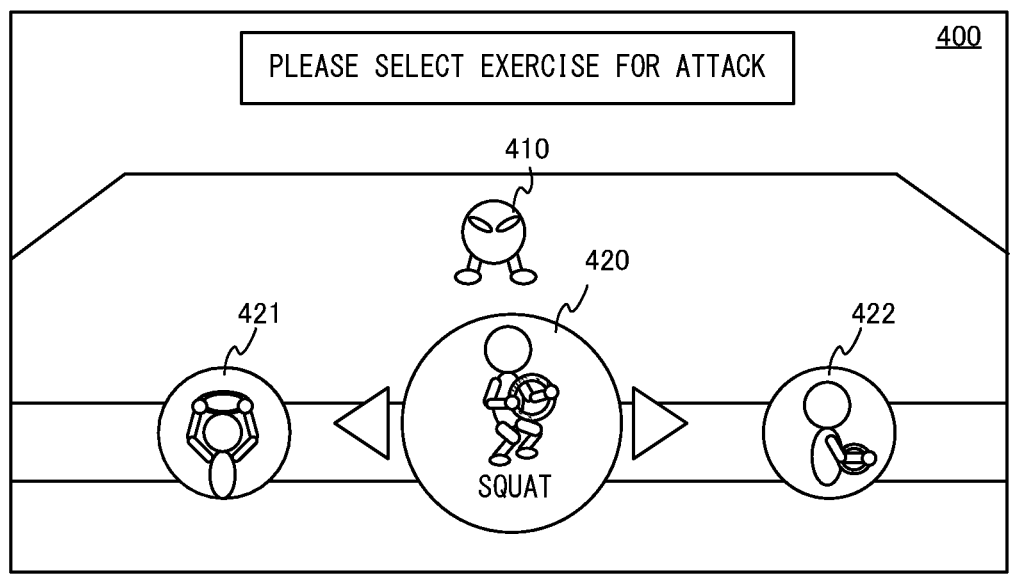
FIG. 16 is a diagram showing a non-limiting example of the scene where the user character 401 attacks an enemy character 410, and is a diagram showing a non-limiting example of a selection screen on which the user selects an exercise to be executed.

FIG. 16 is a diagram showing an example of the scene where the user character 401 attacks the enemy character 410, and is a diagram showing an example of a selection screen on which the user selects an exercise to be executed.

As shown in FIG. 16, in an exercise event when the user character 401 makes an attack (an exercise event regarding the attack of the user character 401), a selection screen for selecting an exercise is displayed. On the selection screen, the user selects any of a plurality of exercises.

The method in which the user selects any of the plurality of exercises may be any method. For example, the user may set an exercise group in advance in which a plurality of exercises are selected, and when the selection screen in FIG. 16 is displayed, the user may be allowed to select a single exercise from the exercise group set in advance. Alternatively, the user may set an exercise group in advance in which a plurality of exercises are selected, and when an exercise event is executed, a single exercise may be automatically selected from the set exercise group. Yet alternatively, an exercise group including a plurality of exercises may be prepared in advance by a game producer, and when the selection screen in FIG. 16 is displayed, the user may select a single exercise from the exercise group.

On the selection screen shown in FIG. 16, exercise display images 420 to 422 are displayed. Each exercise display image represents a different exercise. For example, the exercise display image 420 represents "squat". Further, the exercise display image 421 represents an exercise with the name "lift and push", for example. This "lift and push" is the exercise of lifting both arms over the head and pushing the ring controller. Further, the exercise display image 422 represents an exercise with the name "belly push-in", for example. This "belly push-in" is the exercise of pressing the ring controller against the abdominal area.

For example, the user inputs a left-right direction using the analog stick 52 of the ring controller (the right controller 4), thereby selecting any one of the plurality of exercises. On the selection screen shown in FIG. 16, the exercise display image 420 representing "squat" is selected. If the user performs a determination operation in this state, "squat" is selected.

Figure 17:
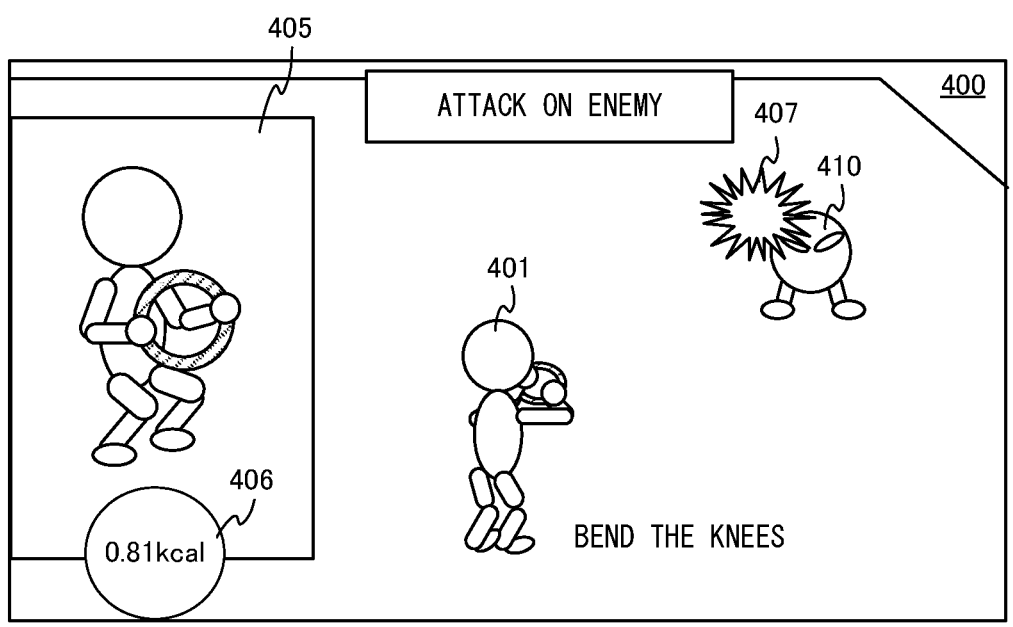
FIG. 17 is a diagram showing a non-limiting example of a game image after "squat" is selected on the selection screen in FIG. 16.

FIG. 17 is a diagram showing an example of a game image after "squat" is selected on the selection screen in FIG. 16.

As shown in FIG. 17, in the attack scene of the user character 401, a first instruction image 405 is displayed that causes the user to perform "squat", which is the exercise selected on the selection screen. The first instruction image 405 represents the specific content of the exercise to be performed by the user. For example, the first instruction image 405 may include an image representing the state where a character performs the exercise corresponding to the current exercise event, and text describing the posture, the motions of the legs, the motions of the arms, and the like when the exercise is performed. It should be noted that the instruction to the user to perform the exercise may be given by not only an image but also a sound.

If the user performs "squat", as shown in FIG. 17, the state where the user character 401 bends both knees is displayed. Further, in accordance with the exercise of the user, an attack on the enemy character 410 is made. For example, an attack effect image 407 is displayed that indicates that an attack on the enemy character 410 is made. By this attack, damage is caused on the enemy character 410. When the extent of the damage caused by the exercise of the user is greater than or equal to a physical strength value set in advance for the enemy character 410, the enemy character 410 falls over. The extent of damage to be caused on the enemy character 410 may differ in accordance with the exercise performed by the user or the load on the user. For example, based on values detected by the sensors (the acceleration sensors, the angular velocity sensors, and the strain gauge), consumed calories or load may be calculated, and in accordance with the consumed calories or the load, the extent of damage to be caused on the enemy character 410 may be determined. For example, when "squat" is performed, based on the number of squats or the extent of bending the legs, the extent of damage to be caused on the enemy character 410 may be determined. Further, the consumed calorie value of calories consumed by the exercise may be calculated, and the consumed calorie value may be displayed as a consumed calorie image 406. For example, every time an exercise is performed, calories may be added to the total consumed calorie value since the game is started, and the total consumed calorie value may be displayed as the consumed calorie image 406. Further, in a case where the game is performed multiple times on the same day, the today's total consumed calorie value may be displayed as the consumed calorie image 406.

When the enemy character 410 does not fall over by a single attack on the enemy character 410, next, the enemy character 410 makes an attack (the user character 401 makes a defense). Also in a case where the user character 401 makes a defense, an exercise event is executed, and the user performs an exercise corresponding to the exercise event.

Figure 18:
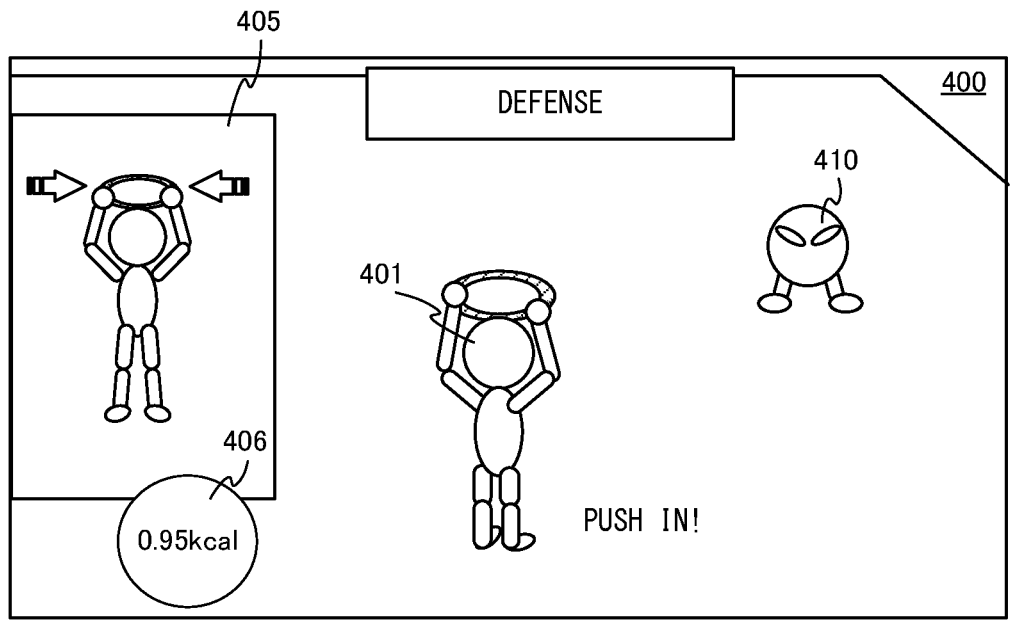
FIG. 18 is a diagram showing a non-limiting example of a game image when the user character 401 defends against the attack of the enemy character 410.

FIG. 18 is a diagram showing an example of a game image when the user character 401 defends against the attack of the enemy character 410. When the user character 401 makes the defense, the selection screen shown in FIG. 16 is not displayed, and the user performs an exercise determined in advance. That is, in the exercise event regarding the defense of the user character 401, the user is not allowed to select an exercise themselves, and performs an exercise determined in advance. For example, as the exercise corresponding to the exercise event regarding the defense of the user character 401, "lift and push" is set in advance. Thus, in the defense of the user character 401, as shown in FIG. 18, the first instruction image 405 for causing the user to perform "lift and push" is displayed. "Lift and push" is the exercise in which the user lifts both arms and pushes the ring controller inward. Thus, a first instruction (the display of the first instruction image 405 and/or the output of a sound) is given that makes it easy for the user to perform this exercise.

Figure 19:
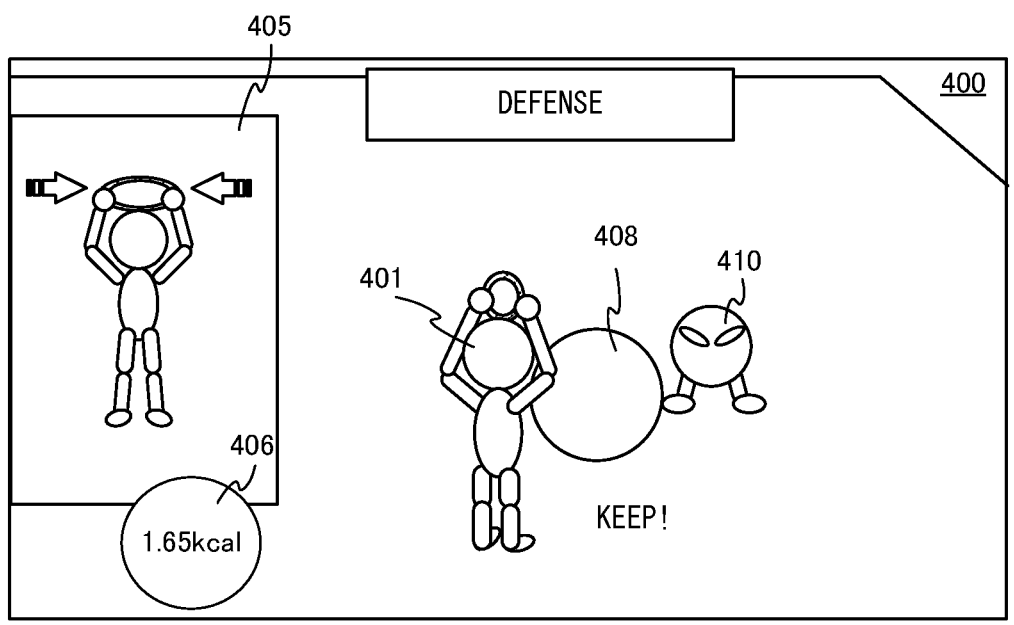
FIG. 19 is a diagram showing a non-limiting example of a game image when the user performs an exercise in accordance with an instruction after the game image shown in FIG. 18 is displayed.

FIG. 19 is a diagram showing an example of a game image when the user performs the exercise in accordance with the instruction after the game image shown in FIG. 18 is displayed.

As shown in FIG. 19, when the user performs the exercise determined in advance, the state where the user character 401 performs the exercise is displayed. Further, a defense effect image 408 is displayed that indicates that the user character 401 defends from the attack of the enemy character 410. Further, a consumed calorie value based on this exercise is added to the previous consumed calorie value, and the resulting consumed calorie value is displayed as the consumed calorie image 406.

The attack of the user character 401 shown in FIGS. 16 and 17 and the defense of the user character 401 shown in FIGS. 18 and 19 are alternately made. In the attack or defense scene of the user character 401, at least one exercise event is executed, and in accordance with the exercise event, at least one exercise is performed by the user.

As a result of the attack of the user character 401 (i.e., as a result of the exercise of the user), when the user character 401 defeats the enemy character 410, the fight scene between the user character 401 and the enemy character 410 ends, and the game progresses. For example, if the fight scene ends, the game transitions to the scene where the user character 401 on a minecart advances on the rail 404. Also in the scene where the user character 401 advances on the rail 404, the minecart with the user character 401 on board advances based on the exercise of the user. That is, also in the scene where the user character 401 advances on the rail 404, another exercise event is executed, and the user performs an exercise corresponding to the exercise event. If the user does not perform the exercise, the user character 401 does not move forward, and therefore, the game does not progress. Thus, to cause the game to progress, the user performs an exercise corresponding to an exercise event in each scene of the game.

As described above, in the game according to the exemplary embodiment, during the execution of the game, an exercise event for causing the user to perform an exercise is executed, and the user performs an exercise corresponding to the exercise event, whereby the game progresses.

(Exercise Support Function)

Here, in the game that progresses based on such an exercise of the user, some user may wish to avoid a particular exercise, or it may be difficult for some user to perform a particular exercise. In this case, the user may give up the progress of the game.

Thus, in the exemplary embodiment, an exercise support function is prepared so that the user can advance the game without performing an exercise. The exercise support function is the function of enabling the user to advance the game without performing an exercise. To cause the exercise support function to operate, the user sets exercise support themselves in advance.

FIG. 20 is a diagram showing an example of an exercise support setting screen.

As shown in FIG. 20, on the exercise support setting screen, in accordance with an input from the user, information regarding a body part is set as an example of user information. For example, as the classifications of exercises for which the exercise support function is caused to operate, "the exercise of moving the shoulders", "the exercise of moving the waist", "the exercise of moving the knees", and "the exercise of pressing the belly" are determined in advance. The user can set one or more of these classifications. The information set here is stored in, for example, the flash memory 84 (or the external storage medium attached to the slot 23).

Here, for each of the plurality of exercises, information indicating whether or not the exercise is "the exercise of moving the shoulders", whether or not the exercise is "the exercise of moving the waist", whether or not the exercise is "the exercise of moving the knees", and whether or not the exercise is "the exercise of pressing the belly" is set in advance. When an exercise to be executed in an exercise event is included in the classifications of the exercises set on the exercise support setting screen, the game progresses even if the user does not perform the exercise.

Figure 21:
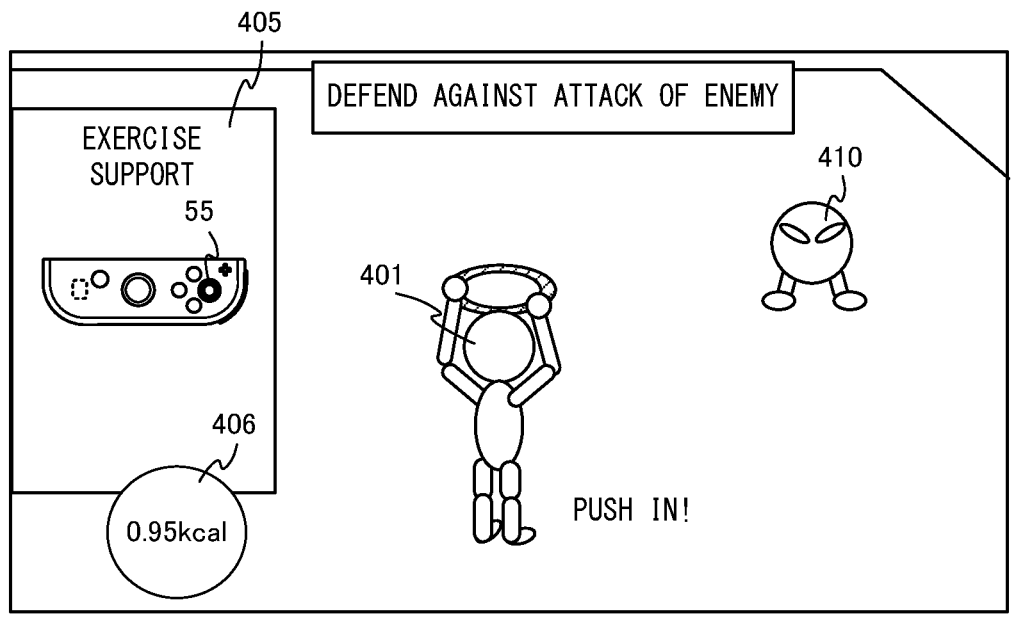
FIG. 21 is a diagram showing a non-limiting example of a game image in the defense scene of the user character 401 shown in FIG. 18 in a case where exercise support is set.

FIG. 21 is a diagram showing an example of a game image in the defense scene of the user character 401 shown in FIG. 18 in a case where the exercise support is set.

As shown in FIG. 21, for example, in a case where "the exercise of moving the shoulders" is set in advance on the exercise support setting screen by the user, and when "lift and push" is to be performed as an exercise corresponding to an exercise event, the exercise support function operates. In this case, the second instruction image 405 for causing the user to perform a button operation is displayed. In the second instruction image 405, instead of the image shown in FIG. 18 in which a character lifts both arms and pushes in the ring controller, for example, an image for causing the user to press the X-button 55 of the ring controller (the right controller 4) is displayed. That is, when the exercise support function operates, the exercise "lift and push" is replaced by the operation of pressing the X-button 55. It should be noted that as a second instruction to the user to perform a button operation, a sound may be output in addition to (or instead of) the display of the second instruction image 405.

It should be noted that the button operation to be performed here is not limited to the operation of pressing a predetermined button, and may be any operation such as the operation of holding down the predetermined button or the operation of pressing the predetermined button in a timely manner (e.g., a button operation corresponding to a rhythm).

Except for the second instruction image 405, basically, an image similar to that when the exercise support is not set is displayed.

Figure 22:
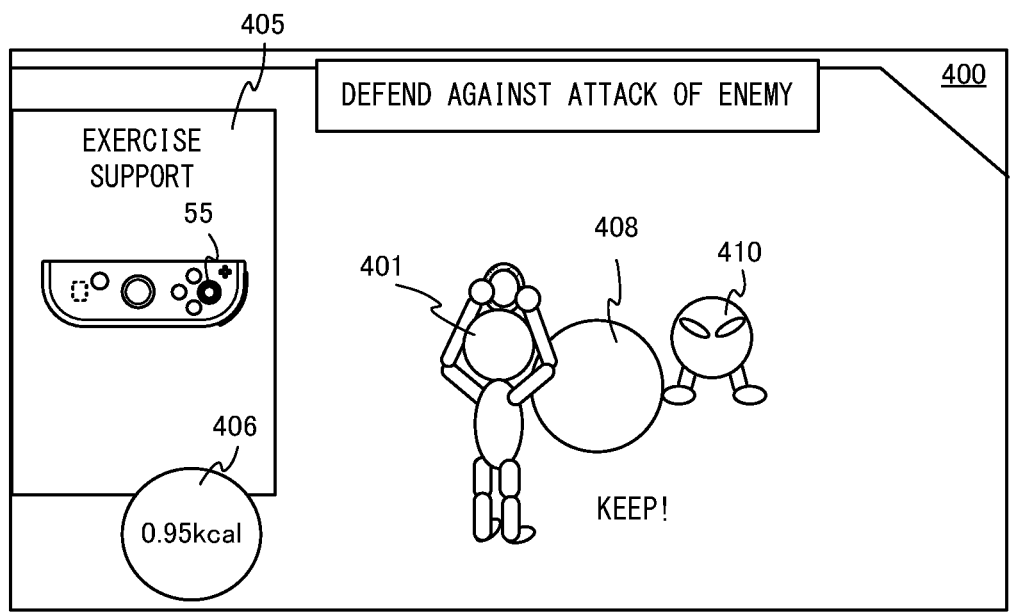
FIG. 22 is a diagram showing a non-limiting example of a game image after an X-button 55 is pressed in a case where the image shown in FIG. 21 is displayed.

FIG. 22 is a diagram showing an example of a game image after the X-button 55 is pressed in a case where the image shown in FIG. 21 is displayed.

As shown in FIG. 22, when the X-button 55 is pressed, an image similar to that when the user performs the exercise "lift and push" is displayed. Specifically, similarly to FIG. 19, a defense effect image 408 is displayed that indicates that the user character 401 defenses against the attack of the enemy character 410. It should be noted that since the user does not actually perform an exercise, the value of consumed calories indicated by the consumed calorie image 406 does not increase.

After the game image shown in FIG. 22 is displayed, the game progresses similarly to the above. For example, next, the attack of the user character 401 is made for the second time. In the attack of the second user character 401, as described above, the selection screen on which the user selects an exercise is displayed, and the user performs a selected exercise, whereby the attack of the user character 401 is made. When the user character 401 defeats the enemy character 410, the game progresses, and the game transitions to the scene where the user character 401 advances on the rail 404.

As described above, in the exemplary embodiment, when the exercise support is set in advance by the user, and an exercise corresponding to the setting is performed, the game progresses based on a button operation even if the user does not actually perform the exercise. Consequently, even if there is an exercise that the user wishes to avoid or an exercise difficult for the user to perform, it is possible to advance the game according to the exemplary embodiment.

Here, in the exemplary embodiment, when an exercise event is executed, there are a case where an exercise selected by the user is performed, and a case where an exercise set in advance not by the selection of the user is performed. In the above attack scene of the user character 401, the selection screen for selecting an exercise is displayed. Thus, an exercise to be performed in the attack scene is an exercise selected by the user. On the other hand, in the defense scene of the user character 401, the selection screen is not displayed. Thus, an exercise to be performed in the defense scene is an exercise set in advance. In the exemplary embodiment, when an exercise selected by the user is performed, the exercise support function does not operate. When an exercise set in advance by the game producer is performed, the exercise support function can operate. It should be noted that in another exemplary embodiment, even when an exercise selected by the user is performed, the exercise support function may be caused to operate.

FIG. 23 is a diagram showing examples of a plurality of exercise events to be performed during the execution of the game according to the exemplary embodiment.

As shown in FIG. 23, for example, in the scene where the user character 401 advances along the road 403, an exercise event A is executed. The exercise event A is an exercise event for causing the user to perform an exercise determined in advance and causes the user to perform a jogging action. Further, in the attack scene of the user character 401, an exercise event B is executed. The exercise event B is an exercise event regarding the attack of the user character 401 shown in FIGS. 16 and 17. In the exercise event B, the user can select any of the plurality of exercises. In the exercise event B, even when an exercise selected by the user is classified as an exercise set on the exercise support setting screen, the exercise support function does not operate.

Further, next, in the defense scene of the user character 401, an exercise event C is executed. The exercise event C is an exercise event regarding the defense of the user character 401 shown in FIGS. 18 and 19. In the exercise event C, the exercise selection screen is not displayed, and the exercise "lift and push" set in advance is performed. In the exercise event C, the exercise support function can operate. Specifically, when the exercise "lift and push" is classified as an exercise set on the exercise support setting screen, the exercise support function operates (see FIGS. 21 and 22).

If the fight scene between the user character 401 and the enemy character 410 ends, the game transitions to the scene where the user character 401 advances on the rail 404. In this scene, an exercise event D is executed. In the exercise event D, not an exercise selected by the user but the exercise "belly push-in" set in advance is performed. "Belly push-in" is the exercise of pressing the ring controller against the abdominal area.

When "the exercise of pressing the belly" is not set in advance on the exercise support setting screen, the user performs the exercise of pressing the ring controller against the abdominal area, whereby the state where the user character 401 advances on the rail 404 is displayed, and the game progresses. Specifically, in accordance with the exercise of the user, the user character 401 starts moving from a starting point on a rail 404. "The exercise of pressing the belly" continues to be performed, whereby the user character 401 moves to an ending point on the rail 404. If the user character 401 reaches the ending point, the game transitions to the next scene of the game.

On the other hand, when "the exercise of pressing the belly" is set in advance on the exercise support setting screen, the exercise support function operates. Thus, the game is advanced even if the user does not perform the exercise "belly push-in". Specifically, in accordance with a button operation of the user, the exercise event D is skipped. That is, the scene where the user character 401 advances on the rail 404 is skipped (omitted), and the user character 401 warps from the starting point to the ending point on the rail 404. Then, the game transitions to the next scene of the game.

It should be noted that when the exercise support function operates in the exercise event D (the scene where the user character 401 advances on the rail 404), in accordance with a button operation of the user, the state where the user character 401 advances on the rail 404 may be displayed.

It should be noted that also in the scene where the user character 401 advances along the road 403 (the exercise event A), the exercise support function may operate. For example, when "the exercise of moving the knees" is set in advance on the exercise support setting screen, the exercise support function may operate in the scene where the user character 401 advances along the road 403. In this case, even if the user does not perform a button operation, the user character 401 may automatically jog along the road 403.

Further, when the exercise support function operates, depending on the exercise, the exercise may be replaced by a different button operation. For example, "lift and push" may be replaced by the operation of pressing the X-button 55, and "belly push-in" may be replaced by the operation of pressing the A-button 53.

Next, a description is given of information set in advance for each exercise and user information set by the user. FIG. 24 is a diagram showing an example of an exercise information table in which information regarding each exercise set in advance is stored. The information shown in FIG. 24 may be set in advance by the game producer and stored in, for example, the external storage medium attached to the slot 23, the flash memory 84, or the like.

As shown in FIG. 24, for each of the plurality of exercises, an "exercise name" indicating the name of the exercise and "part information" are set in advance. The part information is information regarding the body parts of a person and is information indicating which part of the body is moved by the exercise. The part information includes information regarding each part such as "shoulders", "waist", "knees", or "belly". The information regarding each part is set to "0" or "1". "1" indicates the exercise of moving the part.

For example, the exercise name "squat" indicates the exercise of bending both knees and is classified as the exercise of moving the knees and the waist. Thus, "1" is set for "waist" and "knees", and "0" is set for "shoulders" and "belly". Further, the exercise name "lift and push" indicates the exercise of lifting both arms and pushing in the ring controller and is classified as the exercise of moving the shoulders. Thus, "1" is set for "shoulders", and "0" is set for the other parts. Further, the exercise name "belly push-in" is classified as the exercise of pressing the ring against the abdominal area. Thus, "1" is set for "belly", and "0" is set for the other parts.

Figures 25, 26:
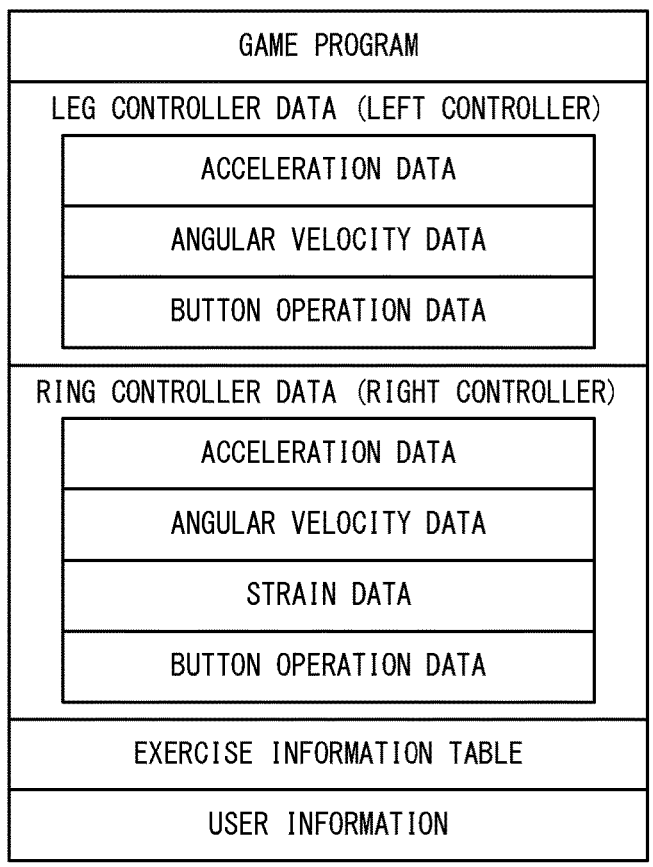
FIG. 25 is a diagram showing a non-limiting example of user information set by the user.
FIG. 26 is a diagram showing a non-limiting example of data stored in the main body apparatus 2.

FIG. 25 is a diagram showing an example of the user information set by the user.

As shown in FIG. 25, the main body apparatus 2 stores a user name, user part information, age, and weight as the user information. These pieces of information are set by inputs from the user. For example, when the game according to the exemplary embodiment is started, the user inputs a user name, and a user account is created. Each user inputs their weight and age. Further, "progress information" is stored with respect to each user. The progress information is information indicating the progress situation of the game, and for example, may include the position of a user character in the virtual space. The pieces of information shown in FIG. 25 are stored as saved data also after the user ends the game.

The user part information is information regarding the body parts of the user and is information set by the user on the exercise support setting screen. The user part information includes information regarding each part such as "shoulders", "waist", "knees", or "belly". When the exercise support is not set, "0" is set in a storage area corresponding to each part. When "the exercise of moving the shoulders" is set on the exercise support setting screen, "1" is set for "shoulders" in the user part information. Further, when "the exercise of moving the waist" is set on the exercise support setting screen, "1" is set for "waist" in the user part information. Further, when "the exercise of moving the knees" is set on the exercise support setting screen, "1" is set for "knees" in the user part information. Further, when "the exercise of pressing the belly" is set on the exercise support setting screen, "1" is set for "belly" in the user part information.

Based on the exercise information table in FIG. 24 and the user information in FIG. 25, it is determined whether or not the exercise support function is to be caused to operate (i.e., whether or not the game is to be caused to progress without causing the user to perform an exercise). Specifically, when at least a part of the part information set in advance for each exercise and at least a part of the user part information set by the user match each other, the exercise support function operates. In other words, when the part information regarding a part set for an exercise determined in advance includes at least a part of the user part information set by the user, the exercise support function operates.

For example, as shown in FIG. 25, as the user part information regarding a user A, "1" is set for "knees". Further, as shown in FIG. 24, as the part information regarding "squat", "1" is set for "waist" and "knees". That is, a squat is set as the exercise of moving the waist and also the exercise of moving the knees. In this case, when an exercise event for causing the user A to perform "squat" as an exercise determined in advance is executed while the user A executes the game, the exercise support function operates. Consequently, the user A can cause the game to progress without performing "squat". It should be noted that when the user A selects "squat" on the exercise selection screen in a certain exercise event, the exercise support function does not operate.

Further, for example, as the user part information regarding a user B, "1" is set for "shoulders". Thus, when an exercise (lift and push) in which "1" is set for "shoulders" is performed as an exercise determined in advance while the user B executes the game, the exercise support function operates. On the other hand, when an exercise (squat or belly push-in) in which "1" is not set for "shoulders" is performed as an exercise determined in advance while the user B executes the game, the exercise support function does not operate.

As described above, in the exemplary embodiment, the game progresses by the user performing an exercise. When there is an exercise that the user wishes to avoid or an exercise difficult for the user to execute, the user can set exercise support in advance and store the set exercise support as user information in the main body apparatus 2. Specifically, the user sets information regarding the body parts as the user information. When an exercise determined in advance is performed in an exercise event during the execution of the game, and the exercise corresponds to the user information set by the user, the exercise support function operates.

By such an exercise support function, even when the user wishes to avoid some exercise, or it is difficult for the user to execute some exercise, it is possible to advance the game. Thus, it is possible to cause the user to perform an exercise (an exercise that the user can execute) over a long period.

(Details of Processing)

Next, an example of processing performed by the main body apparatus 2 is specifically described. First, data stored in the main body apparatus 2 is described.

FIG. 26 is a diagram showing an example of the data stored in the main body apparatus 2. The data shown in FIG. 26 is mainly stored in the DRAM 85. Alternatively, a part or all of the data may be stored in the flash memory 84, or may be stored in the external storage medium attached to the slot 23.

As shown in FIG. 26, in the main body apparatus 2, a game program, leg controller data, ring controller data, an exercise information table, and user information are stored. In addition to these pieces of data, various pieces of data such as data regarding the position and the orientation of a user character placed in a virtual space, data regarding an enemy character, data regarding a terrain in the virtual space, and data regarding other objects placed in the virtual space are stored.

The game program is a program for executing the game according to the exemplary embodiment and is a program for executing processing based on flow charts described below. The game program is stored in, for example, the external storage medium or the flash memory 84 and loaded from the external storage medium or the flash memory 84 into the DRAM 85. It should be noted that the game program may be acquired from another apparatus via a network (e.g., a LAN, a WAN, the Internet, or the like).

The leg controller data is data transmitted from the left controller 3. The leg controller data includes acceleration data regarding accelerations detected by the acceleration sensor 104, angular velocity data regarding angular velocities detected by the angular velocity sensor 105, and button operation data corresponding to operations on the buttons of the left controller 3. It should be noted that the leg controller data is transmitted from the left controller 3 at predetermined time intervals (e.g., 1/200-second intervals).

The ring controller data is data transmitted from the right controller 4. The ring controller data includes acceleration data regarding accelerations detected by the acceleration sensor 114, angular velocity data regarding angular velocities detected by the angular velocity sensor 115, button operation data regarding operations on the buttons 113 (the buttons 53 to 56 and the like) of the right controller 4, and strain data (ring operation data) regarding the deformation of the ring-shaped portion 201 detected by the strain detector 211. It should be noted that the ring controller data is transmitted from the right controller 4 at predetermined time intervals (e.g., 1/200-second intervals).

The exercise information table is a table in which information set for each exercise is stored, and as shown in FIG. 24, includes part information regarding the body parts of a person. The part information in the exercise information table is set in advance by the game producer.

The user information is information set with respect to each user, and as shown in FIG. 25, includes user part information regarding the body parts of the user. The user information is set by inputs from each user.

(Description of Flow Chart)

Figure 27:
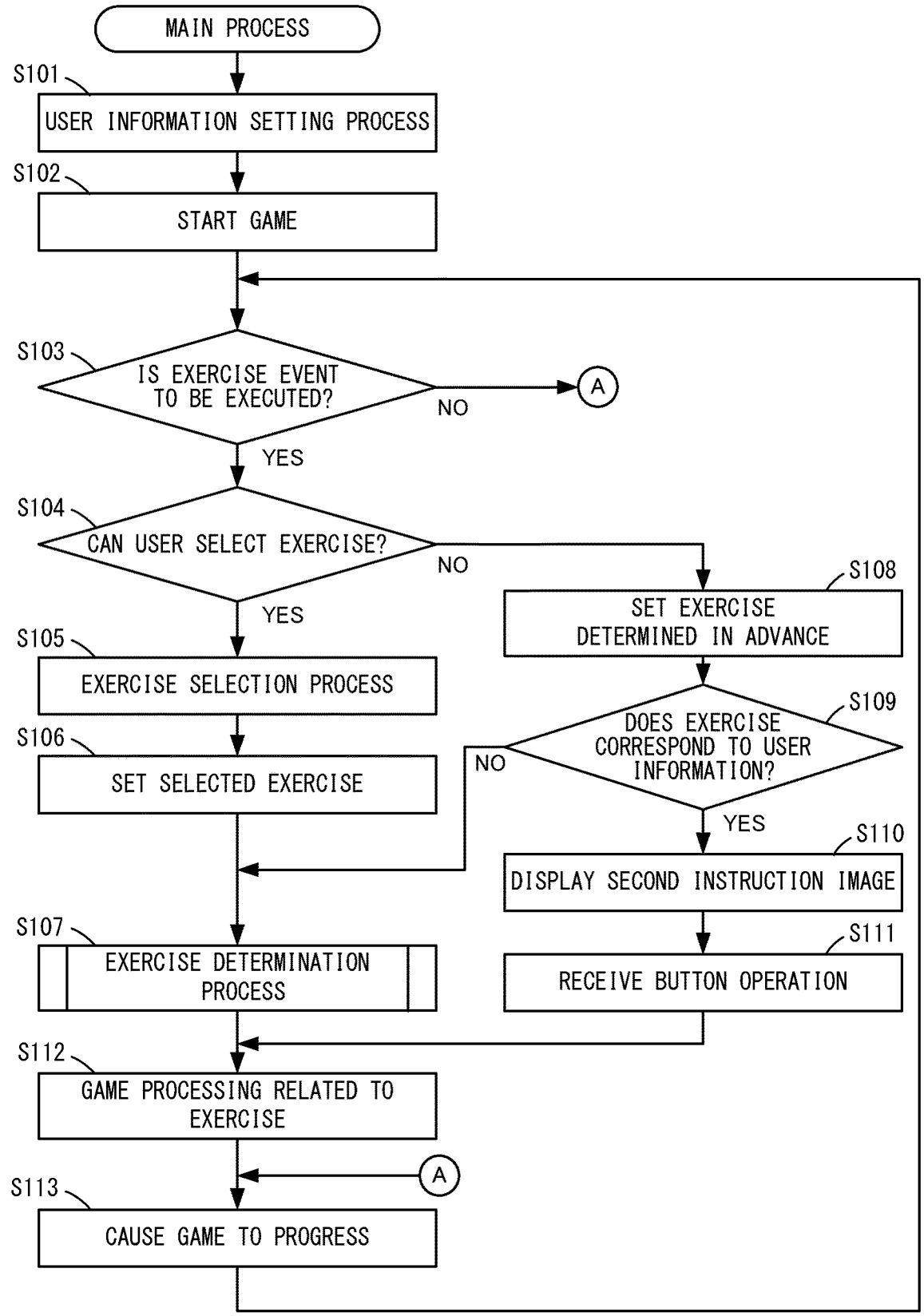
FIG. 27 is a flow chart showing a non-limiting example of a main game process performed by a processor 81 of the main body apparatus 2.

Next, the details of the processing performed by the main body apparatus 2 are described. FIG. 27 is a flow chart showing an example of a main process performed by the processor 81 of the main body apparatus 2. The processing shown in FIG. 27 is performed by the processor 81 of the main body apparatus 2 executing the above game program. It should be noted that FIG. 27 mainly shows processes regarding the above exercise support function and omits other processes.

As shown in FIG. 27, first, the processor 81 performs a user information setting process (step S101). In the user information setting process, the exercise support setting screen shown in FIG. 20 is displayed, and exercises for which the exercise support function is to be caused to operate are set based on inputs from the user. After the user information setting process in step S101, the game is started (step S102). It should be noted that also after the game is started, the exercise support setting screen may be called by a predetermined operation of the user, and the user information setting process may be performed.

Next, the processor 81 determines whether or not an exercise event is to be executed (step S103). For example, when the user character 401 is located at a predetermined position in the virtual space, the processor 81 may determine that an exercise event is to be executed. For example, when the user character 401 is located on the road 403 as shown in FIG. 14, the determination of the processor 81 is "YES" in step S103. Further, when the user character 401 is located at a position shown in FIG. 15, the determination of the processor 81 is "YES" in step S103.

When it is determined that an exercise event is not to be executed (step S103: NO), the processor 81 executes the process of step S113 described below. After the determination is NO in step S103, the process of step S113 is performed, whereby the game progresses, and an image of the transition from the current game scene to the next game scene is displayed. For example, an opening scene is displayed at the start of the game, and the opening scene is displayed until the game transitions to the next game scene (e.g., the scene shown in FIG. 14).

On the other hand, when it is determined that an exercise event is to be executed (step S103: YES), the processor 81 determines whether or not the user can select an exercise corresponding to the exercise event (step S104). Whether or not the user can select an exercise corresponding to the exercise event is determined in advance in accordance with the scene of the game. For example, in the scene where the user character 401 attacks the enemy character 410, the user can select an exercise. Further, in the defense scene of the user character 401, the user cannot select an exercise. Further, in the scene where the user character 401 moves along the road 403 as shown in FIG. 14, the user cannot select an exercise. Depending on the scene of the current game, the processor 81 determines whether or not the user can select an exercise.

When it is determined that the user can select an exercise (step S104: YES), the processor 81 executes an exercise selection process (step S105). For example, the processor 81 displays the selection screen in FIG. 16 and causes the user to select an exercise.

Next, the processor 81 sets the exercise selected by the user in the exercise selection process (step S106). Consequently, the exercise selected in step S105 is set as an exercise corresponding to the current exercise event.

After step S106, the processor 81 performs an exercise determination process (step S107). In the exercise determination process, based on sensor data from the ring controller and the leg controller, it is determined whether or not the user performs the set exercise. The details of the exercise determination process in step S107 will be described below.

On the other hand, when it is determined that the user cannot select an exercise (step S104: NO), the processor 81 sets an exercise determined in advance (step S108). Here, the exercise selection process in step S105 is not performed, and an exercise determined in advance by the game producer is set in accordance with the scene of the game.

Next, the processor 81 determines whether or not the exercise set in step S108 is an exercise corresponding to the user information (step S109). Here, it is determined whether or not the exercise event to be executed corresponds to the user information set in advance by the user. The determination is the determination of whether or not the exercise support function is to be caused to operate. Specifically, with reference to the exercise information table, based on the user information set in advance by the user, the processor 81 determines whether or not at least a part of the part information regarding the set exercise and at least a part of the user part information match each other.

When the determination is "NO" in step S109, the processor 81 executes the exercise determination process in step S107.

On the other hand, when the determination is "YES" in step S109, the processor 81 displays the second instruction image 405 (see FIG. 21) for causing the user to press a button (step S110) and receives a button operation from the user (step S111). Specifically, based on button operation data from the ring controller (or the leg controller), the processor 81 determines whether or not a predetermined button (e.g., the X-button 55) is pressed by the user. When the predetermined button is pressed, the processing proceeds to the next step. It should be noted that in a case where the game is automatically advanced without even a button operation, and when the determination is "YES" in step S109, steps S110 and S111 are not executed, and step S112 is executed next. For example, in the scene where the user character 401 moves along the road 403 as shown in FIG. 14, when the determination is "YES" in step S109, step S112 is executed next. Consequently, when the exercise to be executed is an exercise corresponding to the user information, the game automatically progresses even if the user does not perform the exercise or a button operation. For example, in the scene as shown in FIG. 14, when "the exercise of moving the knees" is stored in advance as the user information, the state where the user character 401 moves along the road 403 is displayed even if the user does not perform a jogging action (stamp their feet) or a button operation.

When the process of step S111 is executed, or when the process of step S107 is executed, the processor 81 performs game processing related to the exercise (step S112). For example, the processor 81 displays an image corresponding to the exercise performed by the user. For example, when the exercise event that is being executed is an exercise event regarding the attack of the user character 401, the processor 81 displays the attack effect image 407 (see FIG. 17). For example, when the exercise event that is being executed is an exercise event regarding the defense of the user character 401, the processor 81 displays the defense effect image 408 (see FIG. 19 or 22). For example, when the exercise event that is being executed is an exercise event regarding the scene where the user character 401 moves along the road 403, the processor 81 displays an image in which the user character 401 jogs along the road 403. It should be noted that in a case where the exercise support function operates, and when the exercise event is to be skipped, the game processing related to the exercise in step S112 is not performed, and the process of step S113 is executed next.

After the process of step S112, the processor 81 causes the game to progress (step S113). "Causing the game to progress" as used herein refers to, for example, causing the game to transition from the current scene to the next scene, or causing the user character 401 to move forward along a predetermined path. For example, in the case of the scene where the user character 401 and the enemy character 410 fight against each other, the fight scene ends, and the game next transitions to the scene where the user character 401 moves on the rail 404. It should be noted that in the scene where the user character 401 moves along the road 403 as shown in FIG. 14, when the exercise support function does not operate, the processes of steps S107, S112, and S113 are repeatedly executed a predetermined number of times. Consequently, when the user continues stamping their feet, the user character 401 moves along the road 403, and the game progresses. Then, at the time when the user character 401 reaches a predetermined position in the virtual space, this movement scene ends and transitions to the next game scene (the scene shown in FIG. 15). When the user does not stamp their feet, the user character 401 stops on the road 403, and the game does not progress. On the other hand, when the exercise support function operates, the scene where the user character 401 automatically moves along the road 403 is displayed until the game transitions to the next game scene. Alternatively, when the exercise support function operates, the scene where the user character 401 automatically moves along the road 403 may be skipped, and the game may transition to the next game scene. It should be noted that in the above example, after the fight scene between the user character 401 and the enemy character 410 ends, the game transitions to the scene where the user character 401 moves on the rail 404. As another example, after the fight scene, the game may transition to another battle scene next without inserting the scene where the user character 401 moves.

After the process of step S113, the processing returns to step S102.

It should be noted that the determination of whether or not the exercise support function is to be caused to operate (the determination in step S109) may be made after step S103. That is, when it is determined that an exercise event is to be executed, it may be determined whether or not the exercise event to be executed corresponds to the user information. When the exercise event to be executed corresponds to the user information (specifically, when an exercise to be performed in the exercise event corresponds to the user information), steps S110 and S111 are executed next, whereby the exercise support function operates. When the exercise event to be executed does not correspond to the user information, the exercise support function does not operate, and the exercise determination process based on sensor data (step S107) is performed.

(Exercise Determination Process)

Figure 28:
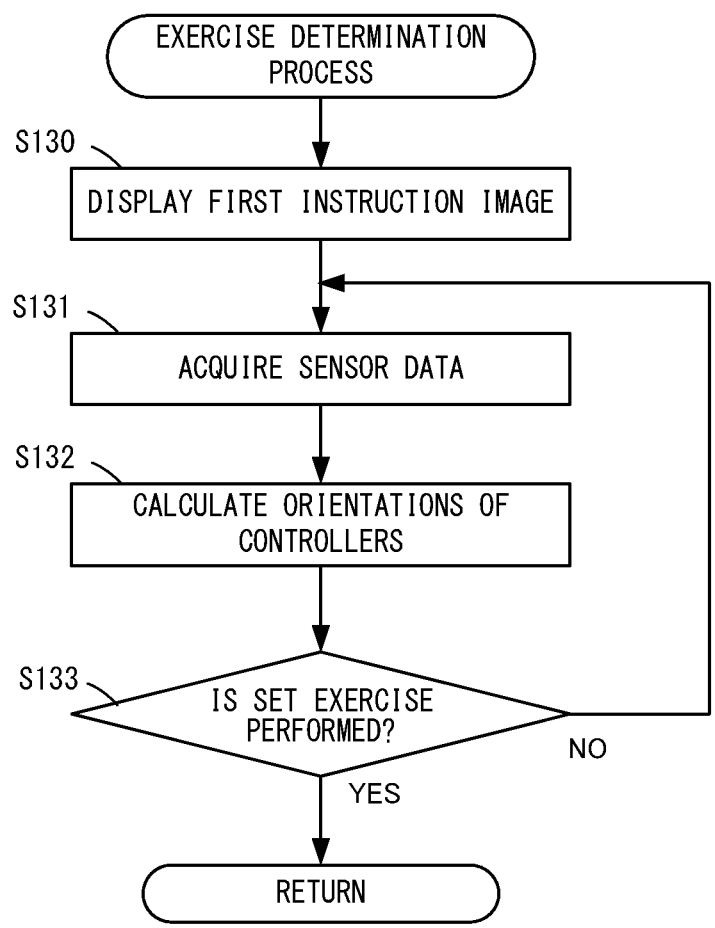
FIG. 28 is a flow chart showing a non-limiting example of an exercise determination process in step S107.

Next, the exercise determination process in the above step S107 is described. FIG. 28 is a flow chart showing an example of the exercise determination process in the step S107.

As shown in FIG. 28, the processor 81 displays the first instruction image 405 (see FIG. 18) for causing the user to perform the set exercise (step S130).

After step S130, the processor 81 acquires sensor data from the leg controller and the ring controller (step S131). Specifically, the processor 81 acquires data corresponding to the outputs of the acceleration sensor 114, the angular velocity sensor 115, and the strain detector 211 of the ring controller (the right controller 4) as sensor data. Further, the processor 81 acquires data corresponding to the outputs of the acceleration sensor 104 and the angular velocity sensor 105 of the leg controller (the left controller 3) as sensor data.

Next, based on the acquired sensor data, the processor 81 calculates the orientations of the leg controller and the ring controller (step S132). Specifically, based on acceleration data and angular velocity data from the leg controller (the left controller 3), the processor 81 calculates the orientation of the leg controller. Further, based on acceleration data and angular velocity data from the ring controller (the right controller 4), the processor 81 calculates the orientation of the ring controller.

Subsequently, the processor 81 determines whether or not the exercise set in step S106 or S108 is performed (step S133). Based on the orientation of each controller calculated in step S132, the acceleration of each controller, and strain data (the data corresponding to the output of the strain detector 211) acquired in step S131, the processor 81 determines whether or not the user performs the set exercise. Specifically, a plurality of conditions regarding sensor data and corresponding to exercises are stored in advance in the main body apparatus 2. For example, a condition regarding sensor data corresponding to "squat", a condition regarding sensor data corresponding to "lift and push", a condition regarding sensor data corresponding to "jogging", and the like are stored. These conditions include at least one of a condition regarding the orientation and the motion of each controller and a condition regarding the deformation of the ring controller. When the sensor data acquired from each controller satisfies a predetermined condition associated with the exercise event, the determination of the processor 81 is "YES" in step S133. More specifically, the processor 81 determines whether or not the sensor data from each controller satisfies a predetermined condition corresponding to the set exercise. Here, "the acquired sensor data satisfies the predetermined condition associated with the exercise event" means that the user performs the exercise corresponding to the exercise event. The determination of whether or not the user performs the exercise corresponding to the exercise event may be made based on whether or not the motion of each controller or the pattern of the deformation of the ring controller calculated based on the sensor data acquired in a predetermined period matches a pattern stored in advance. The determination of whether or not the user performs the exercise corresponding to the exercise event may be made by inputting the sensor data acquired in a predetermined period to a trained model and acquiring the output result of the trained model. Here, the trained model is a program for determining the exercise of the user based on the sensor data and is a model learned in advance based on learning data for determining an exercise.

When it is determined that the set exercise is not performed (step S133: NO), the processor 81 executes the process of step S131 again. The processor 81 repeatedly executes the processes of steps S131 to S133 at predetermined time intervals (e.g., $\frac{1}{60}$-second intervals) until the determination is "YES" in step S133.

When it is determined that the set exercise is performed (step S133: YES), the processor 81 ends the processing shown in FIG. 28. Next, the processing proceeds to step S111 in FIG. 27.

It should be noted that the processes shown in the above flow charts are merely illustrative, and the order, and the contents of the processes may be appropriately changed.

As described above, in the exemplary embodiment, during the execution of the game, an exercise event for causing the user to perform an exercise is executed (YES in step S103), and the user performs an exercise corresponding to the exercise event, whereby the game progresses (steps S102 and S112). The user sets user information in advance (step S101). When an exercise that cannot be selected by the user and corresponds to the user information is to be performed in the exercise event (YES in step S109), a button operation is received instead of the exercise corresponding to the exercise event (step S110). Then, in accordance with the button operation, game processing similar to that when the exercise is performed is performed (step S111), and the game progresses (step S112).

Consequently, in a game that progresses by sequentially performing a plurality of types of exercises, even if there is an exercise difficult for the user to execute, the user can advance the game. Thus, it is possible to cause the user to continue the game (an exercise).

Further, in the exemplary embodiment, in a normal state (i.e., when the exercise support function does not operate), when the user performs an exercise corresponding to an exercise event, game processing related to the exercise (e.g., the display of the defense effect image 408 shown in FIG. 19) is performed. Consequently, the user can perform an exercise with the feeling of performing a video game. Thus, it is possible to give the user amusement other than an exercise and cause the user to continuously perform the exercise.

Further, in the exemplary embodiment, when the exercise support function operates, and even if the user does not perform an exercise corresponding to an exercise event, game processing related to the exercise (e.g., the display of the defense effect image 408 shown in FIG. 22) is performed similarly to the normal state. Consequently, when the user wishes to avoid the exercise, or the exercise is difficult for the user to perform, it is possible to cause the game to progress while maintaining the continuity of the game.

Further, in the exemplary embodiment when an exercise that involves the selection of the user is performed, the exercise support function is not caused to operate, and the game is caused to progress in accordance with the exercise of the user. When an exercise determined in advance that does not involve the selection of the user is performed, the exercise support function is caused to operate. Consequently, it is possible to cause the game to progress without performing a particular exercise, while reflecting the intention of the user.

Further, in the exemplary embodiment, in the normal state, the first instruction image 405 (see FIG. 18) for causing the user to perform an exercise is displayed. Thus, it is easy for the user to understand what kind of exercise should be performed. On the other hand, when the exercise support function operates, the first instruction image 405 is not displayed, and the second instruction image 405 (see FIG. 21) for causing the user to perform a button operation is displayed. Thus, it is possible to urge the user to perform a button operation and also prevent the user from erroneously performing an exercise.

(Variations)

While the game according to the exemplary embodiment has been described above, the above exemplary embodiment is merely an example, and may be modified as follows, for example.

For example, in the above exemplary embodiment, a plurality of types of exercises are classified based on the body parts, and the user is caused to input the classification of an exercise (specifically, a body part) for which the exercise support function is to be caused to operate, and classification information corresponding to the classification is stored as user information. In another exemplary embodiment, the plurality of exercises may be classified not only according to the body parts but also from another point of view. For example, the plurality of exercises may be classified based on whether each exercise is an exercise that requires an instantaneous force, an exercise that requires endurance, an aerobic exercise, an anaerobic exercise, or the like.

Further, in another exemplary embodiment, the user may directly specify an exercise that the user wishes to avoid, or an exercise difficult for the user to perform, and exercise information indicating the specified exercise may be stored as user information. For example, a squat and a jump are both "the exercise of moving the legs". If the user sets "the exercise of moving the legs" as part information, the game is caused to progress even if neither a squat nor a jump is performed in an exercise event. Meanwhile, if only "squat" can be set as the exercise information, the user does not need to squat as an exercise event, while the user needs to jump. As described above, the exercise information can be set instead of or in addition to the part information, whereby it is possible to deal with the need of the user in detail. An example has been described where "squat" is set as the exercise information. Alternatively, the exercise information to be set may be a concept including a plurality of exercises of the same type, or may be a concept directed to a uniquely identified exercise. For example, the game may be caused to progress without performing not only a standard squat but also various types of squats in an exercise event. Alternatively, the game may be caused to progress without performing only a particular type of squat in an exercise event.

Further, in another exemplary embodiment, it may be determined whether or not the user performs a predetermined exercise successfully during the execution of the game. If it is determined that the user does not perform the exercise successfully, the exercise may be stored as user information, and the exercise support function may be caused to operate regarding the exercise. Further, when the number of times the user does not perform a predetermined exercise successfully is greater than or equal to a predetermined number, the exercise may be stored as user information, and the exercise support function may be caused to operate. For example, even when "the exercise of moving the knees" is not set in advance as user information, but when "squat" is performed multiple times in an exercise event, and the processor determines that the user does not repeatedly squat successfully, "the exercise of moving the knees" may be set as an exercise for which the exercise support function is to be caused to operate. That is, even when exercise support is not set for a predetermined exercise, but when the user does not repeatedly perform the predetermined exercise successfully, the processor may set exercise support for the predetermined exercise. Here, "setting exercise support for the predetermined exercise" may refer to supporting the entire classification of the predetermined exercise, or may refer to supporting the predetermined exercise itself. In the first case, for example, when the user does not squat successfully, exercise support is set for "the exercise of moving the knees" as a classification to which a squat belongs. Thus, the exercise support function operates for not only a squat but also a jump, and the user can cause the game to progress without performing "the exercise of moving the knees" such as a squat or a jump in an exercise event. On the other hand, in the second case, for example, when the user does not squat successfully, a squat (various types of squats or a particular type of squat) is specified, and exercise support is set. Consequently, the exercise support function operates only for a squat. Thus, the user does not need to squat (various types of a squat or a particular type of squat) as an exercise event, but needs to perform "jump", for example.

Further, in the above exemplary embodiment, when the exercise support function operates, a button operation is received instead of the exercise of the user. That is, when the button operation is performed instead of the exercise, the game is caused to progress. In another exemplary embodiment, an exercise may be replaced by not only a button operation but also a direction operation using an analog stick. When the direction operation using the analog stick is performed, the game may be caused to progress. That is, when a predetermined operation on an operation section that the user can operate with their finger is performed, the game may be caused to progress. It should be noted that the method for causing the game to progress may differ depending on the supported exercise or the classification of the exercise. For example, an operation method (a button operation, an operation using an analog stick, an operation using an acceleration sensor, or the like) close to the image of the action of the supported exercise may be set. Further, when the exercise support function operates, and even if an operation on an operation section is not performed, the game may be automatically caused to progress.

Further, in another exemplary embodiment, in a case where the exercise support function operates, and when an exercise different from an exercise corresponding to an exercise event is performed by the user, the game may be caused to progress. For example, during the execution of the game, in a case where an exercise event for causing the user A shown in FIG. 25 to perform "squat" (the exercise of moving the knees), and when the user A performs "lift and push" (the exercise of moving the shoulders) different from "squat", the game may be caused to progress.

That is, in a case where an exercise event associated with user information (e.g., an exercise event for causing the user to perform "squat") is executed, and when an exercise (e.g., lift and push) different from an exercise (squat) corresponding to the exercise event is performed, the game may be caused to progress. In other words, in a case where the exercise support function operates, an exercise corresponding to an exercise event is replaced by another exercise different from the exercise, and when sensor data satisfying a second condition corresponding to the exercise after the replacement is acquired, the game may be caused to progress.

Further, in the above exemplary embodiment, regarding an exercise selected by the user, the exercise support function is not caused to operate. Alternatively, in another exemplary embodiment, even when an exercise is selected by the user, but when the exercise corresponds to user information, the exercise support function may be caused to operate. For example, after the process of step S106, the process of step S109 may be performed.

Further, in another exemplary embodiment, when the exercise support function operates, at least one, other than an exercise associated with user information, of a plurality of exercises may be automatically selected. For example, in a case where the exercise of moving the knees is set as user information, and when an exercise event is to be executed, an exercise different from the exercise of moving the knees may be automatically selected. Then, when the user performs the automatically selected exercise, the game may be caused to progress. The exercise to be automatically selected may be one of a plurality of exercises set in advance by the user, or may be one of a plurality of exercises set by the game producer.

Further, in the above exemplary embodiment, when the exercise support function operates, game processing related to an exercise (e.g., the display of the defense effect image 408) is performed similarly to when the exercise is performed. That is, in the above exemplary embodiment, normally, when it is determined that an exercise corresponding to an exercise event is performed by the user, a process related to the exercise is performed, and then, the exercise event is ended, thereby causing the game to progress. On the other hand, when the exercise support function operates, and even when it is not determined that an exercise corresponding to an exercise event is performed by the user, the same process related to the exercise is performed, and then, the exercise event is ended, thereby causing the game to progress.

In a case where the exercise support function operates, and when an exercise event is executed, the exercise event may be skipped. In this case, a process related to an exercise is not performed. For example, after the game image urging a button operation shown in FIG. 21 is displayed, in accordance with the button operation, the game image representing the state where the user character defends against the attack of the enemy as in FIG. 22 may not be displayed, and an exercise event regarding the defense of the user character 401 may end, whereby the game may progress. Alternatively, the game image urging a button operation shown in FIG. 21 may not be displayed, either, and the exercise event regarding the defense of the user character 401 may be automatically skipped.

Further, in the above exemplary embodiment, an exercise event occurs in accordance with the scene in the game, and an exercise is performed, thereby advancing the scene of the game. That is, the exercise event is executed as a part of the entirety of the game. As described above, the relationship between the game and the exercise event can also be said to be, as an example, the relationship between the entirety of a game application to be executed in a game program and a particular game included in the game application. Alternatively, the relationship between the game and the exercise event may be the relationship between a game mode and a mini-game in the mode. That is, the relationship between the game and the exercise event can also be said to be, as another example, the relationship between a game mode included in the entirety of a game application to be executed in a game program and a particular game included in the game mode. For example, when the entirety of the game application includes a first game mode and a second game mode, and the first game mode includes a plurality of particular games, the relationship between the game and the exercise event may be the relationship between the first game mode and a particular game included in the first game mode. As described above, in another exemplary embodiment, the relationship between the game and the exercise event may be any relationship so long as the exercise event is configured as a part of the entirety of the game.

Further, the configuration of the game according to the exemplary embodiment system 1 is merely an example, and the above game may be performed in any other configuration. For example, in the above exemplary embodiment, the right controller 4 is attached to the ring-shaped extension apparatus 5, and the left controller 3 is attached to the belt-shaped extension apparatus 6, whereby the ring controller and the leg controller are configured. In another exemplary embodiment, any apparatus may be used so long as the apparatus can detect the exercise of the user. For example, the ring-shaped extension apparatus 5 may have not a circular shape but any shape such as a rod-like shape, an elliptical shape, or an L-shape. Further, an apparatus that deforms by the user applying a force to the apparatus may not be used. Further, for example, a sensor capable of detecting an exercise may be attached to both arms, both legs, the head, the trunk, or the like of the user. Alternatively, the motion of the user may be detected by capturing the user using a camera, and it may be determined whether or not the user performs a predetermined exercise. For example, a marker may be attached to the body of the user, and the motion of the user may be detected by capturing the marker using a camera. Yet alternatively, an apparatus that detects load and includes a surface on which the user gets may detect the exercise of the user. For example, the user may stand and perform an exercise on a predetermined surface, a load value and the position of the center of gravity may change, and the motion of the user may be detected by detecting the load value and the position of the center of gravity.

Further, the above game system 1 may include a plurality of apparatuses connected together via a network (a WAN, the Internet, or the like). Further, instead of the main body apparatus 2, any information processing apparatus (e.g., a personal computer, a smartphone, a tablet terminal, a server, or the like) may be used, and an information processing system including this information processing apparatus may be configured.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
   at least one sensor configured to output sensor data corresponding to an exercise of a user, and
   at least one processor configured to:
      based on input from the user, store in a storage medium user information related to a request for exercise support;
      execute a game including an exercise event that prompts the user to perform an exercise;
      execute the exercise event during the execution of the game;
      acquire the sensor data from the at least one sensor;
      when the acquired sensor data satisfies a first condition associated with the exercise event being executed, perform a process related to the exercise event and cause the game to progress to an advanced game state; and
      when an aspect of the exercise event being executed corresponds to the stored user information, and even when the sensor data is not acquired, perform the process related to the exercise event or skip at least a part of the process related to the exercise event, and cause the game to progress to the advanced game state.

2. The information processing system according to claim 1, further comprising a controller that is operated by the user, wherein:
   operation data corresponding to an operation on the controller is acquired, and
   when the aspect of the exercise event corresponds to the user information, the game is caused to progress based on the operation data.

3. The information processing system according to claim 2, wherein:
   when the aspect of the exercise event does not correspond to the user information, a first instruction is given to the user to perform an exercise corresponding to the exercise event, and
   when the aspect of the exercise event corresponds to the user information, a second instruction is given to the user to perform an operation on the controller.

4. The information processing system according to claim 3, wherein when the aspect of the exercise event corresponds to the user information, the second instruction is given instead of the first instruction.

5. The information processing system according to claim 1, wherein in a case where the aspect of the exercise event corresponds to the user information, and when the sensor data satisfying a second condition different from the first condition is acquired, the game is caused to progress.

6. The information processing system according to claim 1, wherein:
   based on the input from the user, classification information regarding a classification of an exercise is stored in the storage medium as the user information, and
   when the exercise event is associated with a classification indicated by the classification information stored in the storage medium, and even when the sensor data is not acquired, the game is caused to progress.

7. The information processing system according to claim 6, wherein:
   the exercise event is associated with part information regarding a body part,
   based on the input from the user, user part information regarding a body part is stored in the storage medium as the user information, and
   when at least a part of the part information associated with the exercise event and at least a part of the user part information match each other, and even when the sensor data is not acquired, the game is caused to progress.

8. The information processing system according to claim 1, wherein:
   exercise information indicating a particular exercise is stored as the user information in the storage medium, and
   when the exercise event corresponds to the exercise information, and even when the sensor data is not acquired, the game is caused to progress.

9. The information processing system according to claim 1, wherein at least one of a plurality of exercise events other than an exercise event associated with the user information is selected and executed.

10. The information processing system according to claim 1, wherein there is a case where a first exercise event for prompting the user to perform an exercise selected by the user is executed, and there is a case where a second exercise event for prompting the user to perform an exercise determined in advance is executed,
    in a case where the first exercise event is executed, and when the sensor data satisfying a condition corresponding to the exercise selected by the user is acquired, the game is caused to progress to the advanced game state, and
    in a case where the second exercise event is executed, and when an aspect of the second exercise event corresponds to the user information, and even when the sensor data satisfying the condition corresponding to the exercise determined in advance is not acquired, the game is caused to progress to the advanced game state.

11. The information processing system according to claim 1, wherein:
    when the exercise event is executed at a first timing during the execution of the game, and the sensor data satisfying the first condition corresponding to the exercise event is acquired, the exercise event is ended, thereby causing the game to progress, and the exercise event is further executed next at a second timing after the first timing, and when the aspect of the exercise event corresponds to the user information, and even when the sensor data is not acquired, (A) the exercise event is ended by performing the process related to the exercise event, or (B) the exercise event is ended without performing the process related to the exercise event, thereby causing the game to progress.

12. A non-transitory computer readable storage medium having stored therein an information processing program executable by a computer of an information processing apparatus to acquire, from at least one sensor configured to output sensor data corresponding to an exercise of a user, the sensor data, the information processing program, when executed, causing the computer to perform operations comprising:
based on input from the user, storing in a storage medium user information related to a request for exercise support;
executing a game including an exercise event that prompts the user to perform an exercise;
executing the exercise event during the execution of the game;
acquiring the sensor data;
when the acquired sensor data satisfies a first condition associated with the exercise event being executed, perform a process related to the exercise event and cause the game to progress to an advanced game state; and
when an aspect of the exercise event being executed corresponds to the stored user information, and even when the sensor data is not acquired, performing the process related to the exercise event or skipping at least a part of the process related to the exercise event and causing the game to progress to the advanced game state.

13. An information processing apparatus configured to acquire, from at least one sensor configured to output sensor data corresponding to an exercise of a user, the sensor data, the information processing apparatus comprising at least one processor and a memory, the at least one processor being configured to at least:
based on input from the user, store in a storage medium user information related to a request for exercise support;
execute a game including an exercise event that prompts the user to perform an exercise;
execute the exercise event during the execution of the game;
acquire the sensor data from the at least one sensor;
when the acquired sensor data satisfies a first condition associated with the exercise event being executed, perform a process related to the exercise event and cause the game to progress to an advanced game state; and
when an aspect of the exercise event being executed corresponds to the stored user information, and even when the sensor data is not acquired, perform the process related to the exercise event or skip at least a part of the process related to the exercise event, and cause the game to progress to the advanced game state.

14. An information processing method executable by an information processing system configured to acquire, from at least one sensor configured to output sensor data corresponding to an exercise of a user, the sensor data, the information processing method comprising:
based on input from the user, storing in a storage medium user information related to a request for exercise support;
executing a game including an exercise event that prompts the user to perform an exercise;
executing the exercise event during the execution of the game;
acquiring the sensor data;
when the acquired sensor data satisfies a first condition associated with the exercise event being executed, performing a process related to the exercise event and causing the game to progress to an advanced game state; and
when an aspect of the exercise event being executed corresponds to the stored user information, and even when the sensor data is not acquired, performing the process related to the exercise event or skipping at least a part of the process related to the exercise event, and causing the game to progress to the advanced game state.

15. The information processing method according to claim 14, further comprising in a case where the aspect of the exercise event corresponds to the user information, and when the sensor data satisfying a second condition different from the first condition is acquired, causing the game to progress.

16. The information processing method according to claim 14, further comprising:
based on the input from the user, storing in the storage medium as the user information classification information regarding a classification of an exercise; and
when the exercise event is associated with a classification indicated by the classification information stored in the storage medium, and even when the sensor data is not acquired, causing the game to progress.

17. The information processing method according to claim 16, wherein:
the exercise event is associated with part information regarding a body part,
based on the input from the user, user part information regarding a body part is stored in the storage medium as the user information, and
when at least a part of the part information associated with the exercise event and at least a part of the user part information match each other, and even when the sensor data is not acquired, the game is caused to progress.

18. The information processing method according to claim 14, further comprising
storing as the user information in the storage medium exercise information indicating a particular exercise; and
when the exercise event corresponds to the exercise information, and even when the sensor data is not acquired, causing the game to progress.

19. The information processing method according to claim 14, further comprising:
acquiring operation data corresponding to an operation on a controller;
when the aspect of the exercise event corresponds to the user information, causing the game to progress based on the operation data;
when the aspect of the exercise event does not correspond to the user information, giving to the user a first instruction to perform an exercise corresponding to the exercise event; and when the aspect of the exercise event corresponds to the user information, giving to the user a second instruction to perform an operation on the controller.

20. The information processing method according to claim 19, wherein when the aspect of the exercise event corresponds to the user information, the second instruction is given instead of the first instruction.

\* \* \* \* \*